United States Patent
Kim et al.

(10) Patent No.: US 8,564,731 B2
(45) Date of Patent: Oct. 22, 2013

(54) DISPLAY DEVICE

(75) Inventors: Youngmin Kim, Seoul (KR); Sanghoon Kim, Seoul (KR); Hoyoung Seo, Seoul (KR); Deoksoo Kim, Seoul (KR); Sungwoo Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 189 days.

(21) Appl. No.: 12/977,774

(22) Filed: Dec. 23, 2010

(65) Prior Publication Data

US 2011/0149198 A1    Jun. 23, 2011

(30) Foreign Application Priority Data

Dec. 23, 2009  (KR) .................. 10-2009-0129695
Mar. 17, 2010  (KR) .................. 10-2010-0023955
Mar. 30, 2010  (KR) .................. 10-2010-0028685

(51) Int. Cl.
    *G02F 1/1333* (2006.01)
(52) U.S. Cl.
    USPC .......................................................... 349/58
(58) Field of Classification Search
    USPC .......................................................... 349/58
    See application file for complete search history.

(56) References Cited

U.S. PATENT DOCUMENTS

| 6,847,415 | B1 | 1/2005 | Yoshimura et al. ............. 349/58 |
| 2005/0270436 | A1 | 12/2005 | Miyamura et al. |
| 2009/0091920 | A1* | 4/2009 | Naijo et al. .................. 362/97.3 |
| 2009/0108283 | A1* | 4/2009 | Kadotani et al. ................ 257/98 |
| 2009/0225252 | A1 | 9/2009 | Jeong ............................. 349/58 |
| 2011/0235309 | A1* | 9/2011 | Miki et al. .................... 362/97.2 |

FOREIGN PATENT DOCUMENTS

WO     WO 2008/029540 A1    3/2008

OTHER PUBLICATIONS

European Search Report dated Dec. 21, 2011 issued in Application No. 10 01 6057.
European Office Action dated Aug. 16, 2013 issued in Application No. 10 016 057.1.

* cited by examiner

*Primary Examiner* — Timothy L Rude
(74) *Attorney, Agent, or Firm* — Ked & Associates LLP

(57) ABSTRACT

A display device is disclosed. The display device includes a display panel, a frame disposed in the rear of the display panel, a backlight unit disposed between the display panel and the frame, a driver attached to a back surface of the frame, and a back cover that is disposed in the rear of the driver and is connected to the back surface of the frame. At least one of the frame and the back cover includes a heat dissipation member.

6 Claims, 38 Drawing Sheets

(a)					(b)

Lead type

SMD type

Flip chip type

DISPLAY DEVICE

This application claims the benefit of Korean Patent Application Nos. 10-2009-0129695 filed on Dec. 23, 2009, 10-2010-0023955 filed on Mar. 17, 2010, and 10-2010-0028685 filed on Mar. 30, 2010, which are incorporated herein by reference for all purposes as if fully set forth herein.

BACKGROUND OF THE INVENTION

1. Field of the Invention

Embodiments of the invention relate to a display device.

2. Description of the Related Art

With the development of the information society, various demands for display devices have been increasing. Various display devices, such as a liquid crystal display (LCD), a plasma display panel (PDP), an electroluminescent display (ELD), and a vacuum fluorescent display (VFD), have been recently studied and used, so as to meet the various demands for the display devices.

Out of the display devices, a liquid crystal display panel of the liquid crystal display includes a liquid crystal layer, and a thin film transistor (TFT) substrate and a color filter substrate that are positioned opposite each other with the liquid crystal layer interposed therebetween. The liquid crystal display panel displays an image using light provided by a backlight unit of the liquid crystal display.

SUMMARY OF THE INVENTION

In one aspect, there is a display device comprising a display panel, a frame disposed in the rear of the display panel, a driver attached to a back surface of the frame, and a back cover that is disposed in the rear of the driver and is connected to the back surface of the frame.

In another aspect, there is a display device comprising a display panel, a frame disposed in the rear of the display panel, a backlight unit disposed between the display panel and the frame, a driver attached to a back surface of the frame, and a back cover that is disposed in the rear of the driver and is connected to the back surface of the frame, wherein at least one of the frame and the back cover includes a heat dissipation member.

In yet another aspect, there is a display device comprising a display panel, a frame disposed in the rear of the display panel, a backlight unit disposed between the display panel and the frame, an adhesive layer disposed between the backlight unit and the frame, a driver attached to a back surface of the frame, and a back cover that is disposed in the rear of the driver and is connected to the back surface of the frame, wherein the backlight unit includes a substrate, a light source disposed on the substrate, and a resin layer disposed on the substrate to cover the light source.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

Reference will now be made in detail embodiments of the invention examples of which are illustrated in the accompanying drawings. In this regard, each of all display devices, backlight units, light source devices, and any device that includes such backlight unit or light source device discussed below is operatively coupled and configured. Further, a backlight unit according to embodiments of the invention preferably is fixed to a back of a display panel and has a same or similar size as the display panel to correspond to the entire display region of the display panel. Furthermore, such a backlight unit preferably includes a plurality of light sources which are disposed in arrays, lines, patterns, etc. throughout the entire area of the backlight unit that corresponds to the entire display region of the display panel. As such, the light sources are not just located at one side of the display panel, but are preferably dispersed below throughout the entire display region of the display panel. In these figures, arrows indicate a general light emitting direction of the light source, e.g., a general direction in which the light from a light emitting surface of the light source is emitted, but the light from the light source may emit not necessarily in a single line but through an area in the indicated direction.

According to various embodiments of the invention, any one or more features from one embodiment/example/variation of the invention can be applied to (e.g., added, substituted, modified, etc.) any one or more other embodiments/examples/variations discussed below according to the invention. Further any operations/methods discussed below can be implemented in any of these devices/units or other suitable devices/units.

Figure 1:
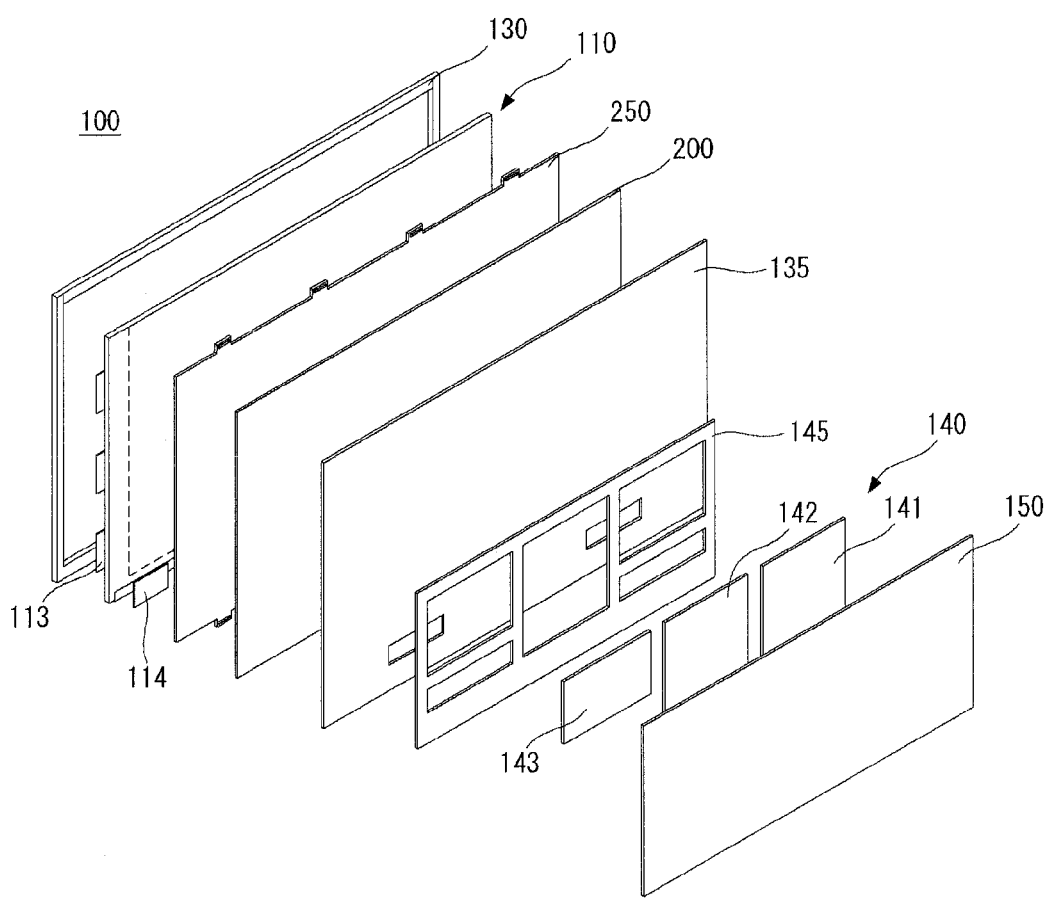
FIGS. 1 to 41 illustrate a configuration of a display device according to an exemplary embodiment of the invention.

FIGS. 1 to 41 illustrate a configuration of a display device according to an exemplary embodiment of the invention. As shown in FIG. 1, a display device 100 according to an exemplary embodiment of the invention may include a display panel 110, an optical layer 250, a backlight unit 200, a front cover 130, a frame 135, a driver 140, and a back cover 150.

The display panel 110 is an image displaying element. The display panel 110 may include a first substrate (not shown) and a second substrate (not shown) that are positioned opposite each other with a liquid crystal layer interposed therebetween and are attached to each other. Although it is not shown, a plurality of scan lines and a plurality of data lines may cross each other in a matrix form on the first substrate also referred to as a thin film transistor (TFT) array substrate, thereby defining a plurality of pixels. Each pixel may include a thin film transistor capable of switching on and off a signal and a pixel electrode connected to the thin film transistor.

Red (R), green (G), and blue (B) color filters corresponding to each pixel and black matrixes may be positioned on the second substrate also referred to as a color filter substrate. The black matrixes may surround the R, G, and B color filters and may cover a non-display element such as the scan lines, the data line, and the thin film transistors. A transparent common electrode covering the R, G, and B color filters and the black matrixes may be positioned on the second substrate.

A printed circuit board (PCB) may be connected to at least one side of the display panel 110 through a connection member such as a flexible circuit board and a tape carrier package (TCP), and the display panel 110 may be closely attached to a back surface of the frame 135 in a module process.

When the thin film transistors selected by each scan line are switched on in response to an on/off signal that is transferred from a gate driving circuit 113 through the scan lines, a data voltage of a data driving circuit 114 is transferred to the corresponding pixel electrode through the data lines and an arrangement direction of liquid crustal molecules changes by an electric field between the pixel electrode and the common electrode. Hence, the display panel 110 having the above-described structure displays an image by adjusting a transmittance difference resulting from changes in the arrangement direction of the liquid crustal molecules.

The backlight unit 200 may be positioned at a back surface of the display panel 110.

The optical layer 250 may be positioned between the backlight unit 200 and the display panel 110.

The display panel 110 and the backlight unit 200 may form a module using the front cover 130 and the frame 135. The front cover 130 positioned on a front surface of the display panel 110 may be a top cover and may have a rectangular frame shape covering an upper surface and a side surface of the display panel 110. An image achieved by the display panel 110 may be displayed by opening a front surface of the front cover 130.

The frame 135 positioned on a back surface of the backlight unit 200 may have a rectangular plate shape. The frame 135 may serve as a base element of the display device 100 when the display panel 110 and the backlight unit 200 form the module.

The driver 140 may be positioned on one surface of the frame 135 by a driver chassis 145. The driver 140 may includes a driving controller 141, a main board 142, and a power supply unit 143. The driving controller 141 may be a timing controller and controls operation timing of each of driving circuits of the display panel 110. The main board 142 transfers a vertical synchronous signal, a horizontal synchronous signal, and a RGB resolution signal to the driving controller 141. The power supply unit 143 applies a power to the display panel 110 and the backlight unit 200. The driver 140 may be covered by the back case 150.

Hereinafter, the backlight unit 200 having various configurations is described in detail.

Figure 2:
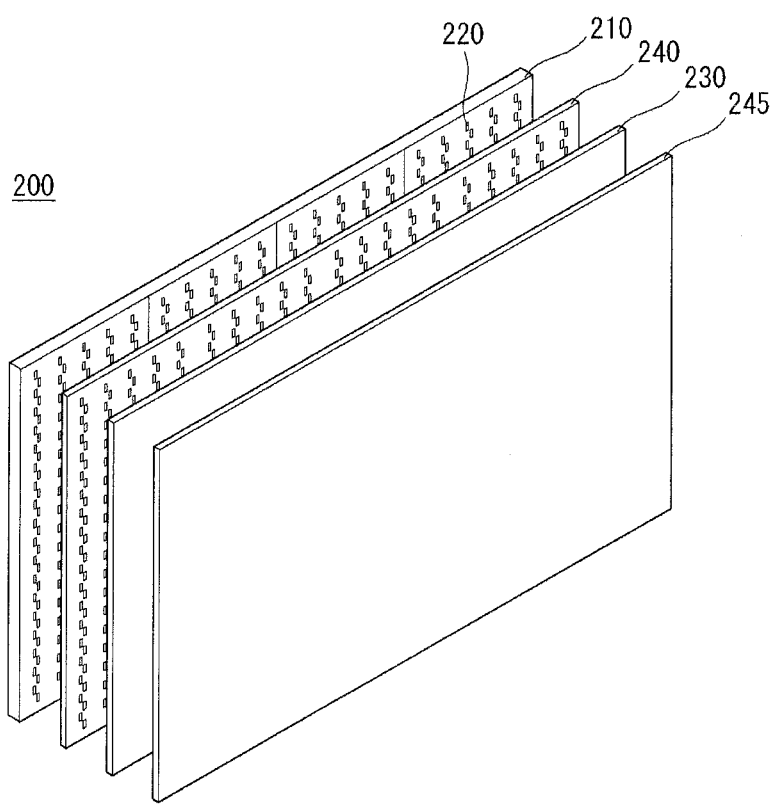
Figure 3:
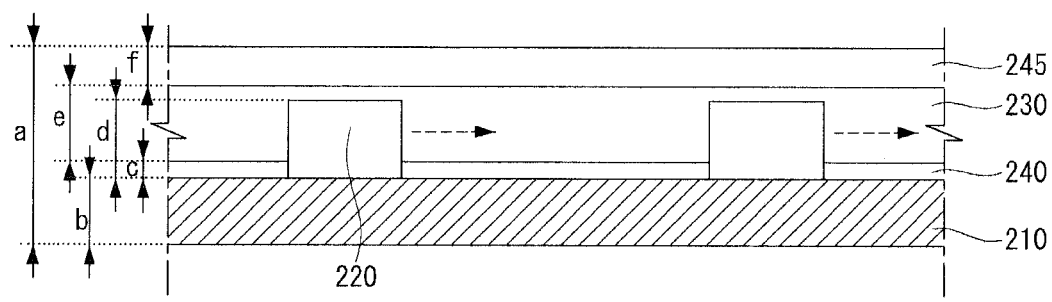

As shown in FIGS. 2 and 3, the backlight unit 200 may include a substrate 210, a plurality of light sources 220, a resin layer 230, and a reflection layer 240.

The plurality of light sources 220 may be formed on the substrate 210, and the resin layer 230 may be formed on the substrate 210 so as to cover the light sources 220.

The substrate 210 may be a substrate on which the plurality of light sources 220 are mounted. An electrode pattern (not shown) for connecting the light sources 220 to an adapter (not shown) for a power supply may be formed on the substrate 210. For example, a carbon nanotube electrode pattern for connecting the light sources 220 to the adapter may be formed on the substrate 210.

The substrate 210 may be formed of polyethylene terephthalate (PET), glass, polycarbonate (PC), or silicon. The substrate 210 may be a printed circuit board (PCB) substrate, on which the plurality of light sources 220 are mounted, and may be formed in a film form.

The light source 220 may be one of a light emitting diode (LED) chip and a light emitting diode package having at least one light emitting diode chip, but can be other type. In the embodiment of the invention, the light emitting diode package is described as an example of the light source 220.

The LED package constituting the light source 220 may be classified into a top view type LED package and a side view type LED package based on a facing direction of a light emitting surface of the LED package. In the embodiment of the invention, the light source 220 may be configured using at least one of the top view type LED package, in which the light emitting surface is upward formed, and the side view type LED package in which the light emitting surface is formed toward the side.

If the side view type LED package is used as the light source 220 in the embodiment of the invention, each of the light sources 220 may have a light emitting surface at a side thereof and may emit light in a lateral direction, i.e., in an extension direction of the substrate 210 or the reflection layer 240. Thus, a thin profile of the backlight unit 200 may be achieved by reducing a thickness "e" of the resin layer 230 formed on the light sources 220. As a result, a thin profile of the display device 100 may be achieved.

The light source 220 may be configured by a colored LED emitting at least one of red light, green light, blue light, etc. or a white LED emitting white light. In addition, the colored LED may include at least one of a red LED, a blue LED, and a green LED. The disposition and emitting light of the light emitting diode can be variously changed within a technical scope of the embodiment.

The resin layer 230 transmits light emitted by the light sources 220, and at the same time diffuses the light emitted by the light sources 220, thereby allowing the light sources 220 to uniformly provide the light to the display panel 110. The resin layer 230 encapsulates (entirely covers) the light sources 220 on the substrate 210.

The reflection layer 240 is positioned on the substrate 210 and reflects light emitted by the light sources 220. The reflection layer 240 may be formed in an area excluding a formation area of the light sources 220 from the substrate 210. The reflection layer 240 reflects light emitted from the light sources 220 and again reflects light totally reflected from a boundary of the resin layer 230, thereby more widely diffusing light. The reflection layer 240 is a layer capable of reflecting the impinging light or a part thereof.

The reflection layer 240 may contain at least one of metal and metal oxide that are a reflection material. For example, the reflection layer 240 may contain metal or metal oxide having a high reflectance, such as aluminum (Al), silver (Ag), gold (Au), and titanium dioxide ($TiO_2$). In this case, the reflection layer 240 may be formed by depositing or coating the metal or the metal oxide on the substrate 210 or by printing a metal ink on the substrate 210. The deposition method may use a heat deposition method, an evaporation method, or a vacuum deposition method such as a sputtering method. The coating method or the printing method may use a gravure coating method or a silk screen method.

The resin layer 230 on the substrate 210 may be formed of a material capable of transmitting light, for example, silicon or acrylic resin. Other materials may be used for the resin layer 230. For example, various types of resin may be used. Further, the resin layer 230 may be formed of a resin having a refractive index of approximately 1.4 to 1.6, so that the backlight unit 200 has a uniform luminance by diffusing light emitted from the light sources 220. For example, the resin layer 230 may be formed of any one material selected from the group consisting of polyethylene terephthalate (PET), polycarbonate (PC), polypropylene, polyethylene, polystyrene, polyepoxy, silicon, acryl, etc.

The resin layer 230 may contain a polymer resin having an adhesion so as to tightly and closely adhere to the light sources 220 and the reflection layer 240. For example, the resin layer 230 may contain an acrylic resin such as unsaturated polyester, methylmethacrylate, ethylmethacrylate, isobutylmethacrylate, normal butylmethacrylate, normal butylmethylmethacrylate, acrylic acid, methacrylic acid, hydroxy ethylmethacrylate, hydroxy propylmethacrylate, hydroxy ethylacrylate, acrylamide, methylol acrylamide, glycidyl methacrylate, ethylacrylate, isobutylacrlate, normal butylacrylate, 2-ethylhexyl acrylate polymer, copolymer, or terpolymer, etc., an urethane resin, an epoxy resin, a melamine resin, etc.

The resin layer 230 may be formed by applying and curing a liquid or gel-type resin on the substrate 210 on which the light sources 220 and the reflection layer 240 are formed. Alternatively, the resin layer 230 may be formed by applying and partially curing a resin on a support sheet and then attaching the resin to the substrate 210.

A diffusion plate 245 may be formed on the resin layer 230 to upward diffuse light emitted from the light sources 220. The diffusion plate 24 may be directly attached to the resin layer 230 or may be attached to the resin layer 230 using a separate adhesive member.

A thickness of the backlight unit 200 having the above-described structure and a thickness of each of components constituting the backlight unit 200 may be adjusted so as to efficiently use light provided to the display panel 110.

More specifically, a total thickness "a" of the backlight unit 200 may be approximately 1.7 mm to 3.5 mm, for example, approximately 2.8 mm. A thickness "b" of the substrate 210 constituting the backlight unit 200 may be approximately 0.2 mm to 0.8 mm, for example, approximately 0.5 mm. A thickness "c" of the reflection layer 240 on the substrate 210 may be approximately 0.02 mm to 0.08 mm, for example, approximately 0.05 mm. Further, a thickness "d" of the light source 220 arranged on the substrate 210 may be approximately 0.8 mm to 1.6 mm, for example, approximately 1.2 mm. The thickness "e" of the resin layer 230 covering the light source 220 may be approximately 0.8 mm to 2.4 mm, for example, approximately 1.3 mm. A thickness "f" of the diffusion plate 245 on the resin layer 230 may be approximately 0.7 mm to 1.3 mm, for example, approximately 1.0 mm.

As the thickness "e" of the resin layer 230 increases, light emitted from the light sources 220 may be more widely diffused. Hence, the backlight unit 200 may provide light having the uniform luminance to the display panel 110. On the other hand, as the thickness "e" of the resin layer 230 increases, an amount of light absorbed in the resin layer 230 may increase. Hence, the luminance of light which the backlight unit 200 provides to the display panel 110 may entirely decrease.

Accordingly, the thickness "e" of the resin layer 230 may be equal to the thickness "d" of the light source 220 or may be equal to or less than 1.5 times the thickness "d" of the light source 220, so that the backlight unit 200 can provide light having the uniform luminance to the display panel 110 without an excessive reduction in the luminance.

Figure 4:
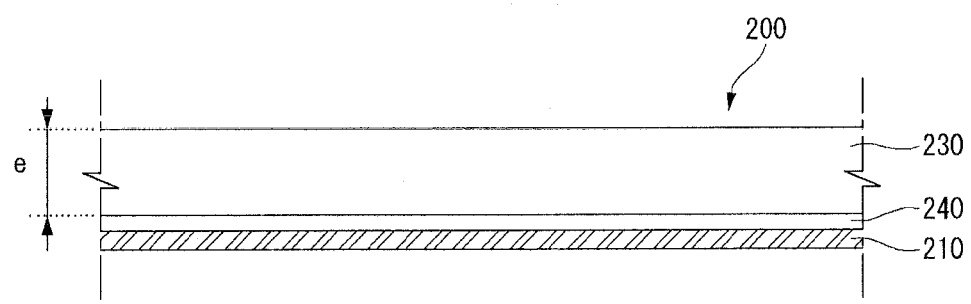

Alternatively, as shown in FIG. 4, the backlight unit 200 may have the structure in which the reflection layer 240 covers an upper surface of the substrate 210 in the non-formation area of the light sources 220. For example, the reflection layer 240 may be formed on the substrate 210 and may have a plurality of holes, into which the light sources 220 may be inserted, at a location corresponding to a formation location of the light sources 220. The light sources 220 may upwardly protrude from the holes of the reflection layer 240 and may be covered by the resin layer 230.

Figure 5:
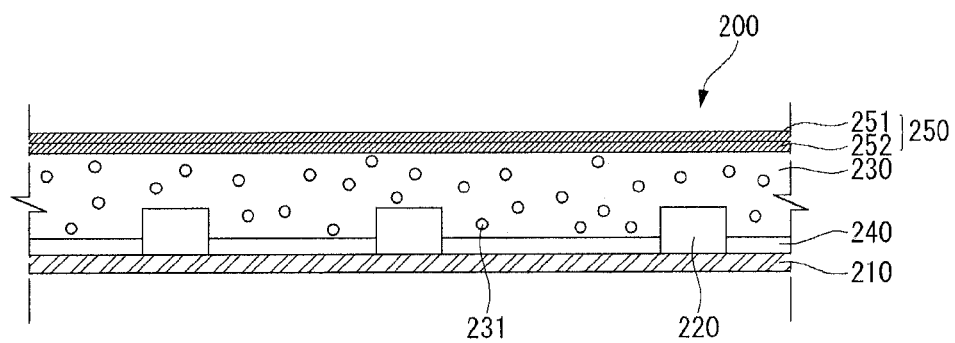

Alternatively, as shown in FIG. 5, the plurality of light sources 220 may be mounted on the substrate 210, and the resin layer 230 may be disposed on the substrate 210. The reflection layer 240 may be formed between the substrate 210 and the resin layer 230, more particularly, on an upper surface of the substrate 210.

The resin layer 230 may include a plurality of scattering particles 231. The scattering particles 231 may scatter or refract incident light, thereby more widely diffusing light emitted from the light sources 220.

The scattering particles 231 may be formed of a material having a refractive index different from a formation material of the resin layer 230 so as to scatter or refract the light emitted from the light source 220. More particularly, the scattering particles 231 may be formed of a material having a refractive index greater than silicon-based resin or acrylic resin forming the resin layer 230. For example, the scattering particles 231 may be formed of polymethylmethacrylate (PMMA)/styrene copolymer (MS), polymethylmethacrylate (PMMA), polystyrene (PS), silicon, titanium dioxide ($TiO_2$), and silicon dioxide ($SiO_2$), or a combination thereof. Further, the scattering particles 231 may be formed of a material having a refractive index less than the formation material of the resin layer 230. For example, the scattering particles 231 may be formed by generating bubbles in the resin layer 230. Other materials may be used for the resin layer 230. For example, the scattering particle 231 may be formed using various polymer materials or inorganic particles.

The optical layer 250 may be disposed on the top of the resin layer 230. The optical layer 250 may include at least one prism sheet 251 and/or at least one diffusion sheet 252. In this case, a plurality of sheets constituting the optical layer 250 are not separated from one another and are attached to one another. Thus, the thickness of the optical layer 250 or the thickness of the backlight unit 200 may be reduced because of the above structure of the optical layer 250.

A lower surface of the optical layer 250 may closely adhere to the resin layer 230, and an upper surface of the optical layer 250 may closely adhere to the lower surface of the display panel 110, i.e., the lower polarizing plate 140.

The diffusion sheet 252 may diffuse incident light to thereby prevent light coming from the resin layer 230 from being partially concentrated. Hence, the diffusion sheet 252 may further uniformize the luminance of light. Further, the prism sheet 251 may focus light coming from the diffusion sheet 252, thereby allowing the light to be vertically incident on the display panel 110.

In the embodiment of the invention, at least one of the prism sheet 251 and the diffusion sheet 252 constituting the optical layer 250 may be removed. The optical layer 250 may further include other functional layers in addition to the prism sheet 251 and/or the diffusion sheet 252.

The reflection layer 240 may include a plurality of holes (not shown) at locations corresponding to formation locations of the light sources 220, and the light sources 220 on the substrate 210 underlying the reflection layer 240 may be inserted into the holes.

In this case, the light sources 220 are downwardly inserted into the holes of the reflection layer 240, and at least a portion of each of the light sources 220 may protrude from the upper surface of the reflection layer 240. Because the backlight unit 200 is configured using the structure in which the light sources 220 are respectively inserted into the holes of the reflection layer 240, a fixation strength between the substrate 210 and the reflection layer 240 can be further improved.

Figure 6:
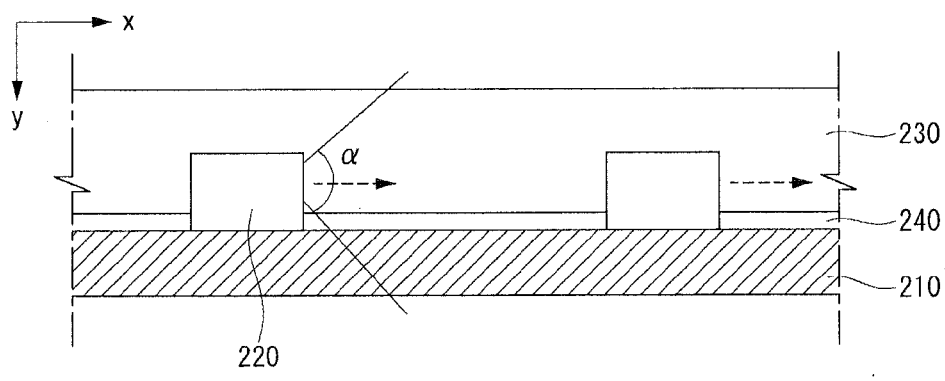

Alternatively, as shown in FIG. 6, each of the plurality of light sources 220 of the backlight unit 200 has the light emitting surface on the side thereof and can emit light in a lateral direction, e.g., a direction in which the substrate 210 or the reflection layer 240 extends.

For example, the plurality of light sources 220 may be configured using the side view type LED package. As a result, it is possible to address a problem that the light sources 220 are observed as a hot spot on the screen and to slim the backlight unit 200. Furthermore, the thin profile of the display device 100 can be achieved because of a reduction of the thickness "e" of the resin layer 230.

In this case, the light sources 220 may emit light having a predetermined orientation angle of α being, for example, 90° to 150° about a first direction x (indicated by an arrow). Hereinafter, a direction of light emitted from the light sources 220 is indicated as the first direction x.

In the embodiment of the invention, light is emitted and diffused upward from the light sources 220 by forming a pattern on the resin layer 230, and thus the backlight unit 200 can emit light having a uniform luminance.

Alternatively, the light sources 220 illustrated in FIGS. 7 to 13 may emit light from the side of the light sources 220 in a lateral direction in the same manner as FIG. 6. Other manners may be used. For example, the light sources 220 may emit light from the top of the light sources 220.

Figure 7:
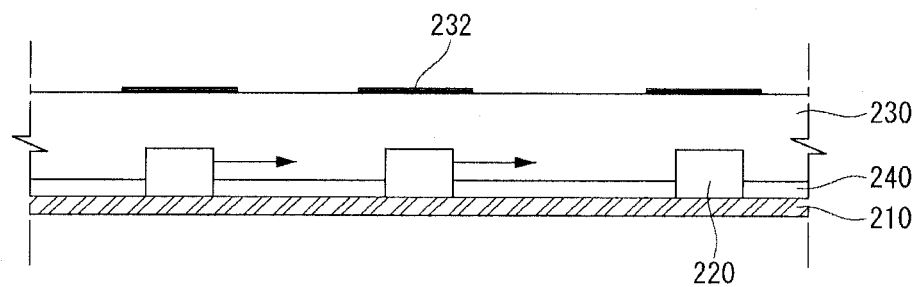

As shown in FIG. 7, a pattern layer including a plurality of first patterns 232 may be formed on the top of the resin layer 230 of the backlight unit 200 including the light sources 220. More specifically, the plurality of first patterns 232 of the pattern layer may be formed on the resin layer 230 at locations corresponding to the formation locations of the light sources 220 (i.e., where the light sources 220 are located).

For example, the first patterns 232 formed on the top of the resin layer 230 may be a pattern capable of reflecting at least a portion of light emitted from the light sources 220.

The first patterns 232 on the resin layer 230 may prevent an increase in a luminance of light in an area adjacent to the light sources 220, and thus the backlight unit 200 may provide light having the uniform luminance.

In other words, the first patterns 232 are formed on the resin layer 230 at the locations corresponding to the formation locations of the light sources 220 and selectively reflect light emitted upward from the light sources 220, thereby reducing the luminance of light in the area adjacent to the light sources 220. The light reflected by the first patterns 232 may be diffused in a lateral direction.

More specifically, the light emitted upward from the light sources 220 is diffused in the lateral direction by the first patterns 232, and at the same time is reflected downward. The light reflected by the first patterns 232 is again diffused in the lateral direction by the reflection layer 240, and at the same time is reflected upward. In other words, the first patterns 232 may reflect 100% of incident light. Alternatively, the first patterns 232 may reflect a portion of the incident light and may transmit a portion of the incident light. As above, the first patterns 232 may control the transfer of light passing through the resin layer 230 and the first patterns 232. As a result, the light emitted from the light sources 220 may be widely diffused in the lateral direction and other directions as well as the upward direction, and thus the backlight unit 200 may emit the light having the uniform luminance.

The first patterns 232 may include a reflection material such as metal. For example, the first patterns 232 may include metal having a reflectance of 90% or more such as aluminum, silver, and gold. For example, the first patterns 232 may be formed of a material capable of transmitting 10% or less of incident light and reflecting 90% or more of the incident light.

In this case, the first patterns 232 may be formed by depositing or coating the above-described metal. As another method, the first patterns 232 may be formed through a printing process using a reflection ink including a metal, for example, a silver ink in accordance with a previously determined pattern.

Further, the first patterns 232 may have a color having a high brightness, for example, a color close to white so as to improve a reflection effect of the first patterns 232. More specifically, the first pattern 232 may have a color having the brightness greater than the resin layer 230.

The first patterns 232 may contain metal oxide. For example, the first patterns 232 may include titanium dioxide ($TiO_2$). More specifically, the first patterns 232 may be formed by printing a reflection ink containing titanium dioxide ($TiO_2$) in accordance with a previously determined pattern.

Figure 8:
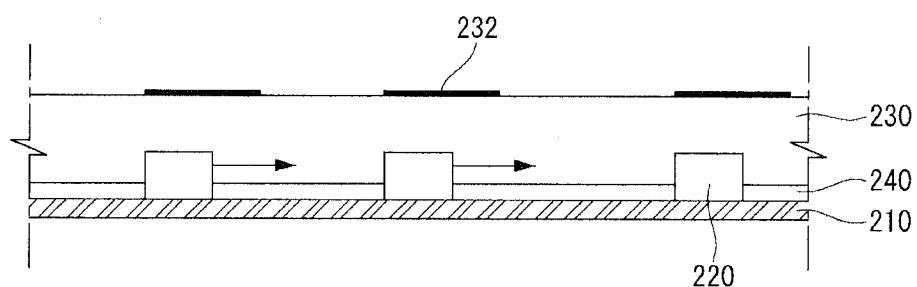
Figure 9:
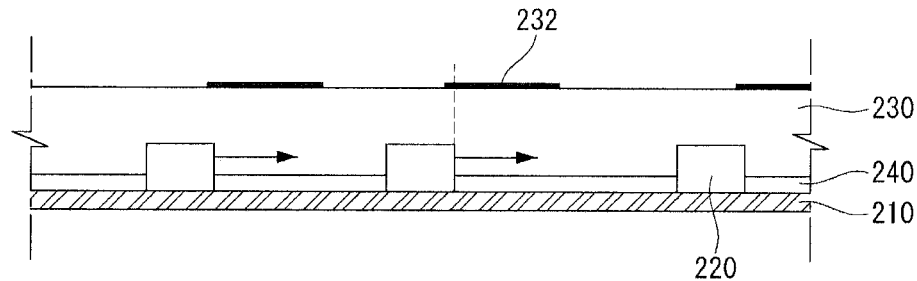
Figure 10:
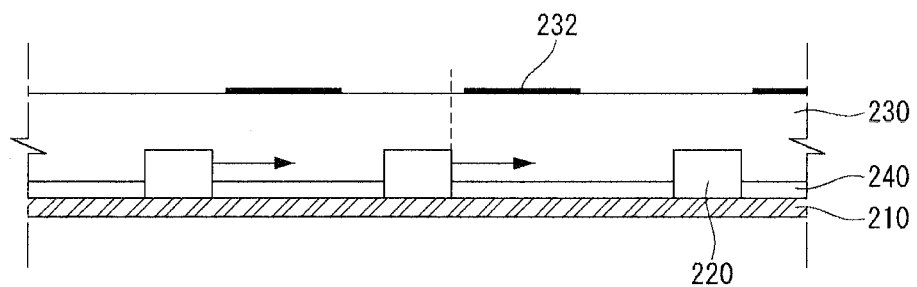

As shown in FIGS. 7 to 10, the formation of the first patterns 232 at the locations corresponding to the locations of the light sources 220 may include a case where a middle portion of the first pattern 232 coincides with a middle portion of the light source 220 corresponding to the first pattern 23 as shown in FIG. 7, and cases where the middle portion of the first pattern 232 does not necessarily coincide with the middle portion of the corresponding light source 220 by a predetermined distance as shown in FIGS. 8-10.

As shown in FIG. 8, the middle portion of the first pattern 232 may not coincide with the middle portion of the light source 220 corresponding to the first pattern 232.

For example, when the light emitting surface of the light source 220 faces not the upward direction but the lateral direction and therefore light is emitted from the light source 220 in the lateral direction, a luminance of light emitted from the side of the light source 220 may decrease while the light emitted from the side of the light source 220 travels through the resin layer 230 in a direction indicated by an arrow of FIG. 8. Hence, light in a first area directly adjacent to the light emitting surface of the light source 220 may have a luminance greater than light in an area around the light emitting surface of the light source 220. Light in a second area adjacent to an opposite direction of the light emitting surface may have a luminance less than the light in the first area. Thus, the first pattern 232 may be formed by moving in an emission direction of light from the light source 220. In other words, the middle portion of the first pattern 232 may be formed at a location (slightly) deviated from the middle portion of the corresponding light source 220 toward the light emitting direction.

As shown in FIG. 9, the first pattern 232 may be formed at a location deviated further than the first pattern 232 illustrated in FIG. 8 toward the light emitting direction. In other words, a distance between the middle portion of the first pattern 232 and the middle portion of the corresponding light source 220 in FIG. 9 may be longer than a distance between the middle portion of the first pattern 232 and the middle portion of the corresponding light source 220 in FIG. 8. For example, the light emitting surface of the light source 220 may overlap a left end portion of the first pattern 232.

As shown in FIG. 10, the first pattern 232 may be formed at a location deviated further than the first pattern 232 illustrated in FIG. 9 toward the light emitting direction. In other words, a formation area of the first pattern 232 may not overlap a formation area of the corresponding light source 220. Hence, a left end portion of the first pattern 232 may be separated from the light emitting surface of the light source 220 by a predetermined distance.

Figure 11:
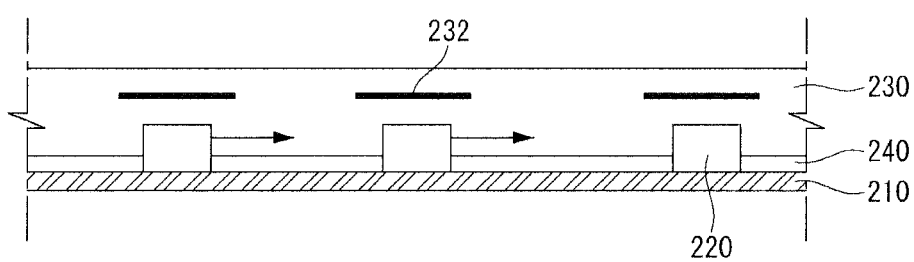

As shown in FIG. 11, the first pattern 232 may be formed inside the resin layer 230. In this case, the middle portion of the first pattern 232 may be formed to coincide with the middle portion of the corresponding light source 220 or may be formed at a location deviated from the middle portion of the corresponding light source 220 toward the light emitting direction in the same manner as FIGS. 8 to 10.

Figure 12:
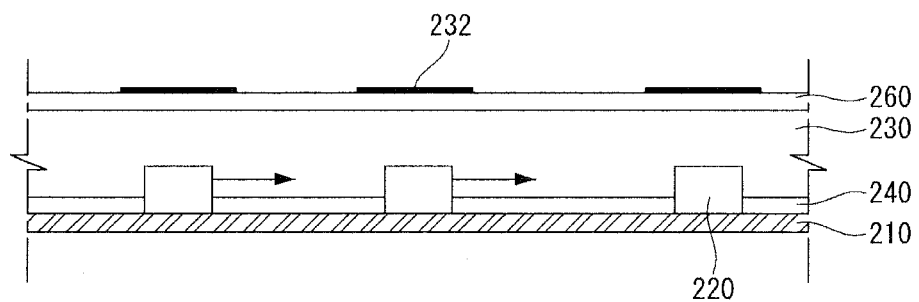

As shown in FIG. 12, the first pattern 232 may be manufactured in a sheet form. In this case, the pattern layer including the plurality of first patterns 232 may be formed on the resin layer 230.

For example, after the plurality of first patterns 232 are formed on one surface of a transparent film 260 through the printing process, etc. to form the pattern layer, the pattern layer including the transparent film 260 may be stacked on the resin layer 230. More specifically, a plurality of dots may be printed on the transparent film 260 to form the first patterns 232.

Figure 13:
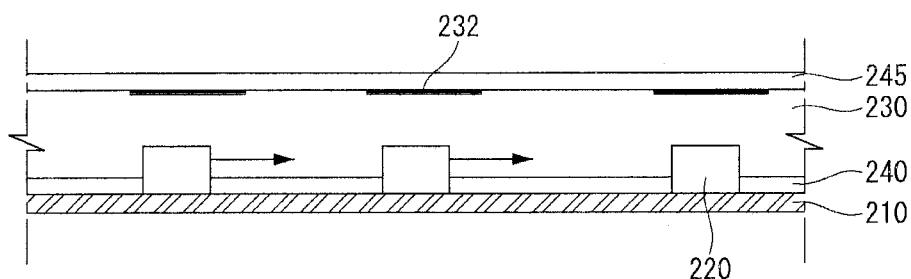

As shown in FIG. 13, the plurality of first patterns 232 may be formed on one surface of the diffusion plate 245 illustrated in FIG. 3. In this case, the first patterns 232 may be coated on one surface of the diffusion plate 245, and the diffusion plate 245 may be formed on the resin layer 230 so that the first patterns 232 contact the resin layer 230.

As a percentage of a formation area of the first pattern 232 increases, an aperture ratio may decrease. Hence, the entire luminance of light which the backlight unit 200 may provide to the display panel 110 may decrease. The aperture ratio may indicate the size of an area of the resin layer 230 that is not occupied by the first pattern 232.

Thus, the aperture ratio of the pattern layer including the first patterns 232 may be equal to or greater than about 70%, so as to prevent the degradation of the image quality resulting from an excessive reduction in the luminance of light provided to the display panel 110. Namely, the percentage of the area of the resin layer 230 occupied by the first pattern 232 is equal to or less about 30% of the total area of the resin layer 230.

Figure 14:
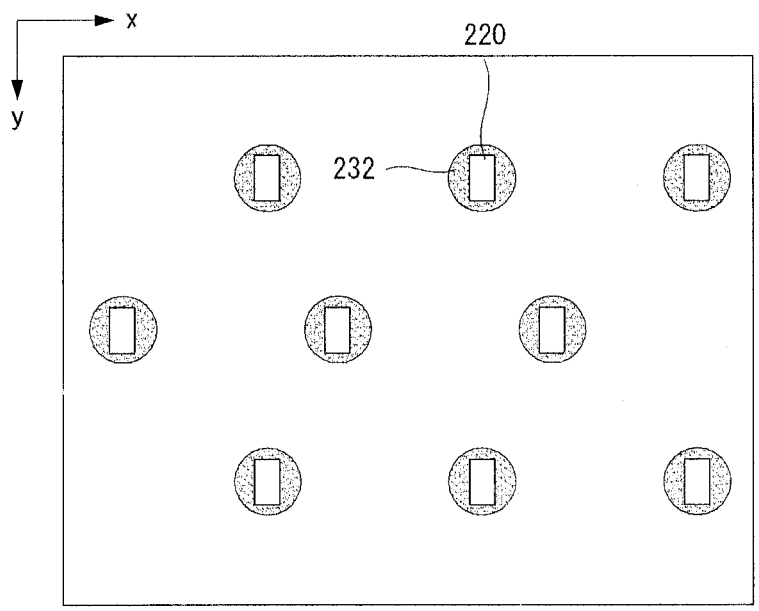

As shown in FIG. 14, the first pattern 232 may have a circle or circular shape or an oval shape around a formation location of the corresponding light source 220. Other shapes and sizes may be used for the first pattern 232. The middle portion of the first pattern 232 may be formed at a location deviated slightly from the middle portion of the corresponding light source 220 toward the light emitting direction in the same manner as FIGS. 8 to 10.

Figure 15:
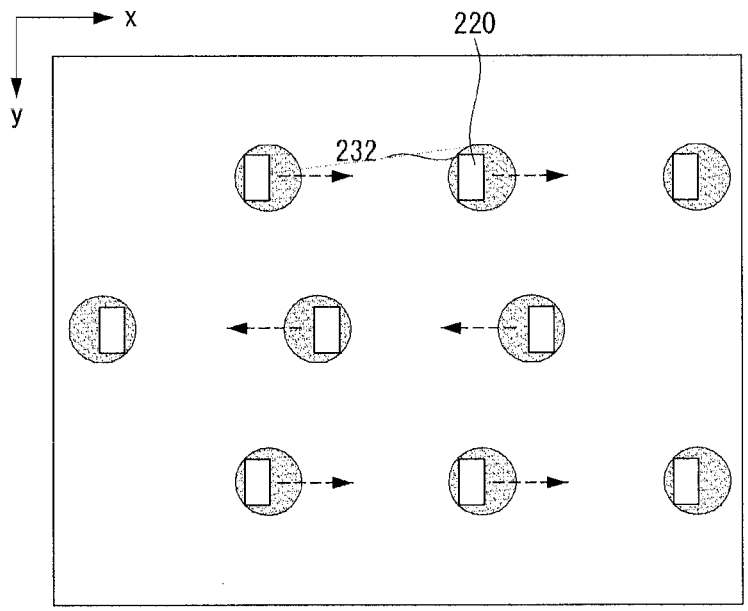

As shown in FIG. 15, the first pattern 232 may be moved in the light emitting direction (e.g., an x-axis direction in FIG. 15) in comparison with that of FIG. 15. Hence, the middle portion of the first pattern 232 may be formed at a location deviated from the middle portion of the corresponding light source 220 toward the light emitting direction by a predetermined distance.

Figure 16:
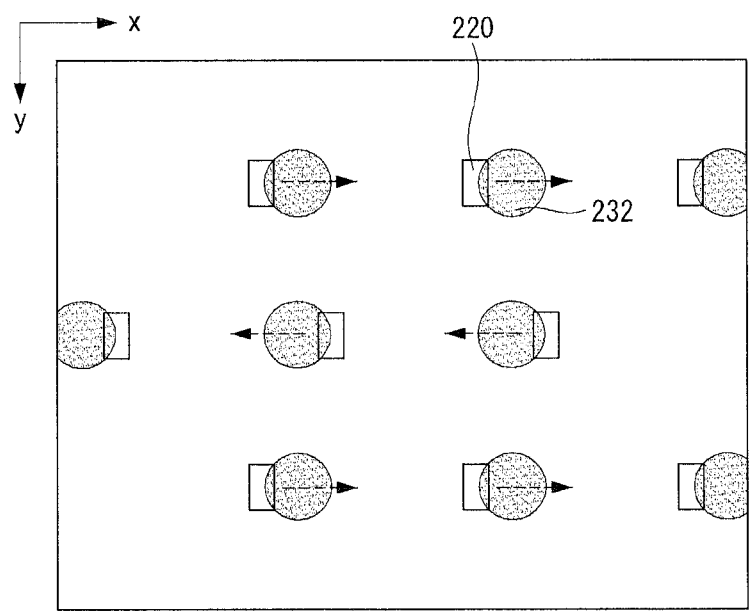

As shown in FIG. 16, the first pattern 232 may be moved toward the light emitting direction further than the first pattern 232 shown in FIG. 16. Hence, a portion of the formation area of the light source 220 may overlap a formation area of the first pattern 232.

Figure 17:
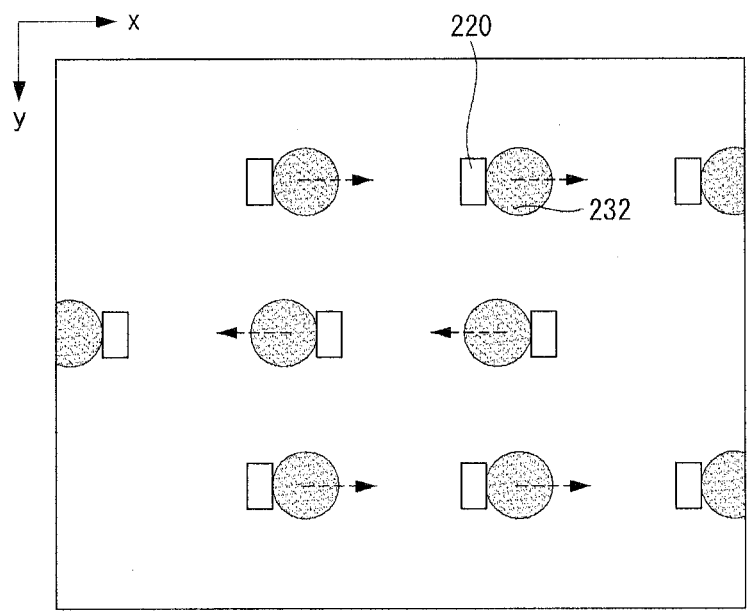

As shown in FIG. 17, the first pattern 232 may be moved toward the light emitting direction further than the first pattern 232 shown in FIG. 17 and thus may be positioned outside the formation area of the light source 220. Hence, the formation area of the light source 220 may not overlap a formation area of the first pattern 232.

FIGS. 18 to 21 illustrate various shapes of each first pattern 232. In FIGS. 18 to 21 the first pattern 232 may be configured by the plurality of dots or regions, and each dot or each region may contain a reflection material, for example, metal or metal oxide.

Figure 18:
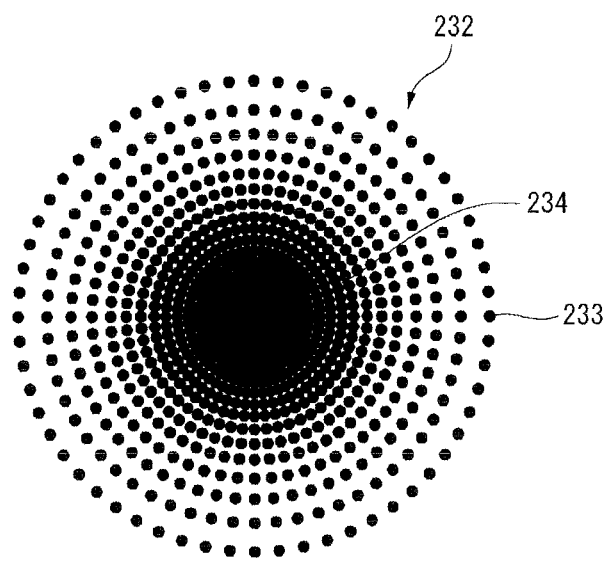

As shown in FIG. 18, the first pattern 232 may have a circle or circular shape around the formation location of the light source 220. Other shapes such as a diamond may be used. A reflectance of the first pattern 232 may decrease as the first pattern 232 extends from a middle portion 234 of the first pattern 232 to the outwardly direction. The reflectance of the first pattern 232 may gradually decrease as the first pattern 232 extends from the middle portion 234 to the outwardly direction, because the number of dots or a reflectance of a material forming the first pattern 232 decreases as the first pattern 232 extends from the middle portion 234 to the outwardly direction.

Further, as the first pattern 232 extends from the middle portion 234 to the outwardly direction, a transmittance or an aperture ratio of light may increase. Hence, the formation location of the light source 220, more specifically, the middle portion 234 of the first pattern 232 corresponding to the middle portion of the light source 220 may have a maximum reflectance (for example, the middle portion 234 having the maximum reflectance does not transmit most of light) and a minimum transmittance or a minimum aperture ratio. As a result, the hot spot generated when light is concentrated in the formation area of the light source 220 may be more effectively prevented.

For example, an aperture ratio of the middle portion of the first pattern 232 overlapping the light source 220 may be equal to or less than about 5% so as to prevent the generation of the hot spot.

In the plurality of dots 233 constituting the first pattern 232, a distance between the adjacent dots 233 may increase as the first pattern 232 extends from the middle portion 234 to the outwardly direction. Hence, as described above, as the first pattern 232 extends from the middle portion 234 to the outwardly direction, the transmittance or the aperture ratio of the first pattern 232 may increase while the reflectance of the first pattern 232 decreases.

Figure 19:
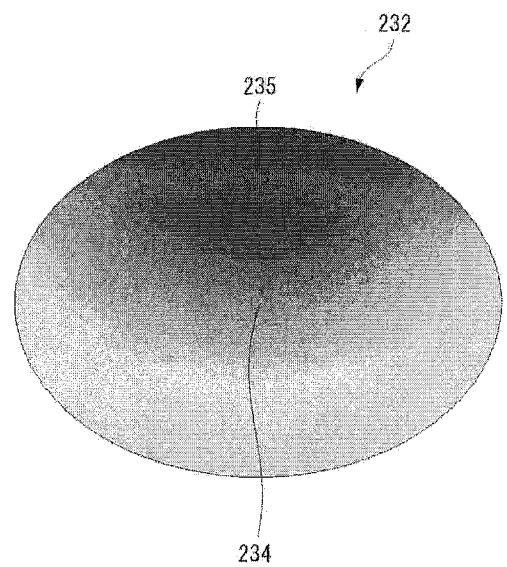

As shown in FIG. 19, the first pattern 232 may have an oval shape. The middle portion 234 of the first pattern 232 may coincide with the middle portion of the corresponding light source 220. Alternatively, the middle portion 234 of the first pattern 232 may not coincide with the middle portion of the corresponding light source 220. In other words, the middle portion 234 of the first pattern 232 may be formed at a location deviated from the middle portion of the corresponding light source 220 toward one direction (for example, a light emitting direction of the corresponding light source 220) in the same manner as FIGS. 8 to 10.

In this case, as the first pattern 232 extends from a portion 237 of the first pattern 232 corresponding to the middle portion of the light source 220 to the outwardly direction, the reflectance of the first pattern 232 may decrease or the transmittance of the first pattern 232 may increase. That is, the portion 237 of the first pattern 232 may be positioned at a location deviated from the middle portion 234 of the first pattern 232 in one direction. The portion 237 of the first pattern 232 may have a maximum reflectance or a minimum transmittance.

Figure 20:
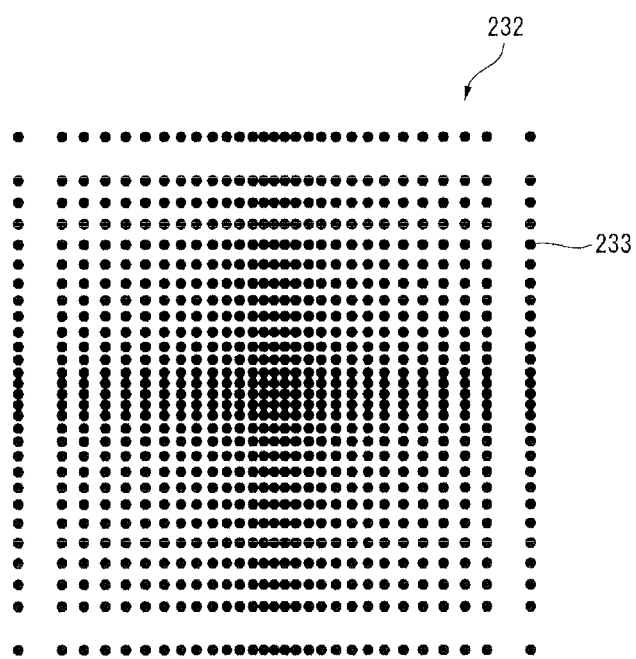
Figure 21:
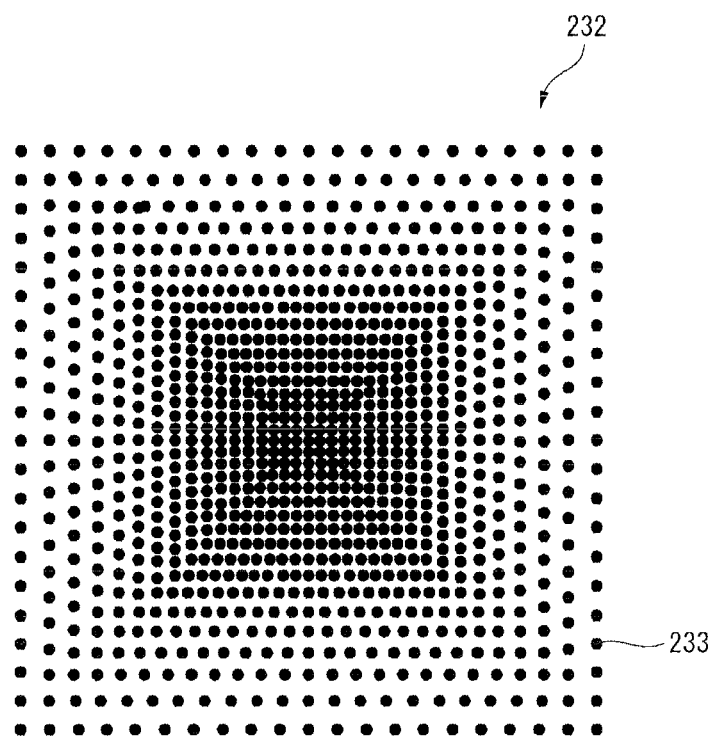

As shown in FIGS. 20 and 21, the first pattern 232 may have a rectangle or rectangular shape around the formation location of the light source 220. As the first pattern 232 extends from the middle portion to the outwardly direction, a reflectance of the first pattern 232 may decrease and a transmittance or an aperture ratio may increase.

The first rectangular pattern 232 shown in FIGS. 20 and 21 may have the same characteristics as the first pattern 232 shown in FIGS. 18 and 19. For example, an aperture ratio of the middle portion of the first pattern 232 overlapping the light source 220 may be equal to or less than 5% so as to prevent the generation of the hot spot.

Further, as shown in FIGS. 20 and 21, in the plurality of dots 233 constituting the first pattern 232, a distance between the adjacent dots 233 may increase as the first pattern 232 extends from the middle portion to the outwardly direction.

In the embodiment of the invention, the first pattern 232 is configured to include the plurality of dots as shown in FIGS. 18 to 21. However, other configurations may be used. The first pattern 232 may have any configuration as long as the reflectance of the first pattern 232 decreases and the transmittance or the aperture ratio of the first pattern 232 increases as the first pattern 232 extends from the middle portion to the outwardly direction.

For example, as the first pattern 232 extends from the middle portion to the outwardly direction, a concentration of a reflection material, for example, metal or metal oxide may decrease. Hence, the reflectance of the first pattern 232 may decrease and the transmittance or the aperture ratio of the first pattern 232 may increase. As a result, the concentration of light in an area adjacent to the light source 220 may be reduced.

Figure 22:
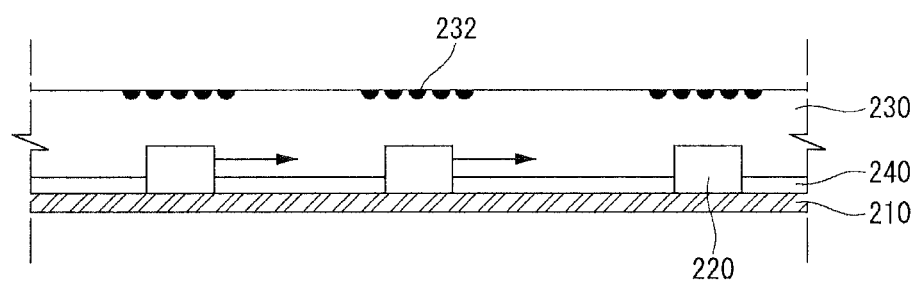

As shown in FIG. 22, the first pattern 232 may have a convex shape protruding toward the light source 220. For example, the first pattern 232 may have a shape similar to a semicircle. A cross-sectional shape of the first pattern 232 may have a semicircle shape or an oval shape protruding toward the light source 220.

The first pattern 232 having the convex shape may reflect incident light at various angles. Hence, the first pattern 232 may uniformize the luminance of light emitted upward from the resin layer 230 by diffusing more widely light emitted from the light source 220.

The first pattern 232 may include the reflection material such as metal or metal oxide as described above. For example, the first pattern 232 may be formed by forming a pattern on top of the resin layer 230 by an intaglio method and then filling the intaglio pattern with a reflection material. Alternatively, the first pattern 232 may be formed on top of the resin layer 230 by printing the reflection material on a film type sheet or attaching beads or metallic particles to the film type sheet and then pressing the film type sheet onto the resin layer 230.

Figure 23:
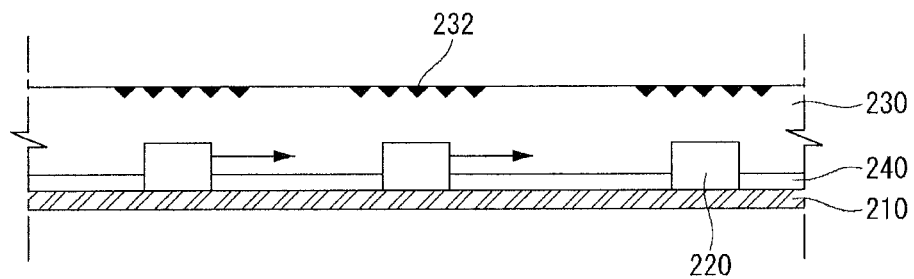

A cross-sectional shape of the first pattern 232 may have various shapes protruding toward the light source 220 in addition to a shape similar to the semicircle shown in FIG. 22. For example, as shown in FIG. 23, the cross-sectional shape of the first pattern 232 may have a triangular shape protruding toward the light source 220. In this case, the first pattern 232 may have a pyramid shape or a prism shape.

Figure 24:
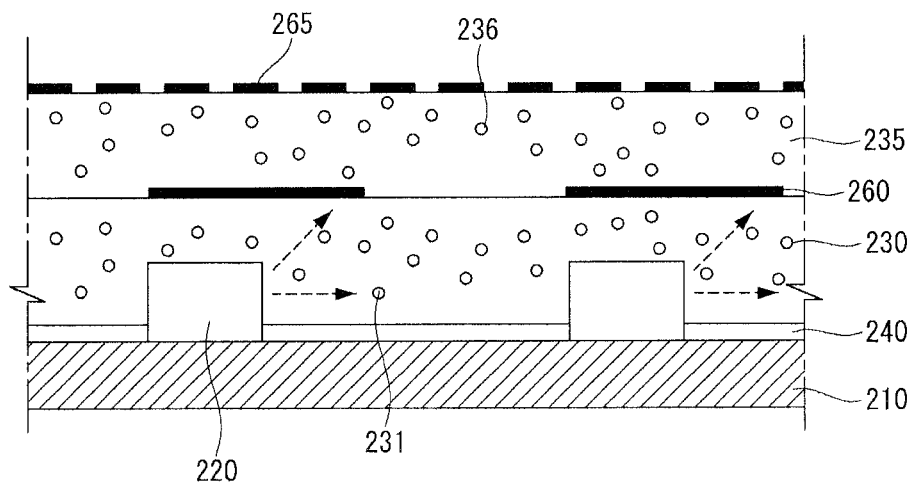

As shown in FIG. 24, light emitted from the light source 220 may be diffused by the resin layer 230 and may be emitted upward. Further, the resin layer 230 can include the plurality of scattering particles 231 to scatter or refract the upward emitted light, thereby making the luminance of the upward emitted light more uniform.

In the embodiment of the invention, another resin layer 235 may be disposed on top of the resin layer 230. The resin layer 235 may be formed of the same material as or a different material from the resin layer 230 and may improve the uniformity of the luminance of the light of the backlight unit 200 by diffusing the light emitted upward from the resin layer 230.

The resin layer 235 may be formed of a material having a refractive index equal to or different from a refractive index of a material forming the resin layer 230. For example, when the resin layer 235 is formed of a material having a refractive index greater than the resin layer 230, the resin layer 235 can more widely diffuse the light emitted from the resin layer 230. In contrast, when the resin layer 235 is formed of a material having a refractive index less than the resin layer 230, a reflectance of light, which is emitted from the resin layer 230 and is reflected on the bottom of the resin layer 235, can be improved. Hence, the resin layer 235 may allow the light emitted from the light source 220 to easily travel along the resin layer 230.

The resin layer 235 may also include a plurality of scattering particles 236. In this case, a density of the scattering particles 236 of the resin layer 235 may be greater higher than a density of the scattering particles 231 of the resin layer 230.

As described above, because the resin layer 235 includes the scattering particles 236 having the density greater than the scattering particles 231 of the resin layer 230, the resin layer 235 can more widely diffuse the light emitted upward from the resin layer 230, thereby making the luminance of the light emitted from the backlight unit 200 more uniform.

In the embodiment of the invention, the first pattern 232 explained by referring to FIGS. 7 to 18 may be formed between the resin layer 230 and the resin layer 235 or inside at least one of the resin layer 230 and the resin layer 235.

As shown in FIG. 24, another pattern layer may be formed on top of the resin layer 235. The pattern layer on the resin layer 235 may include a plurality of second patterns 265.

The second patterns 265 on the top of the resin layer 235 may be reflection patterns capable of reflecting at least a portion of light emitted from the resin layer 230. Thus, the second patterns 265 may uniformize the luminance of light emitted from the resin layer 235.

For example, when the light upward emitted from the resin layer 235 is concentrated in a predetermined portion and is observed as light having a high luminance on the screen, the second patterns 265 may be formed in a region corresponding to the predetermined portion of the top of the resin layer 235. Hence, the second patterns 265 may uniformize the luminance of light emitted from the backlight unit 200 by reducing the luminance of the light in the predetermined portion.

The second pattern 265 may be formed of titanium dioxide ($TiO_2$). In this case, a portion of light emitted from the resin layer 235 may be reflected downward from the second patterns 265, and a remaining portion of the light emitted from the resin layer 235 may be transmitted.

Figure 25:
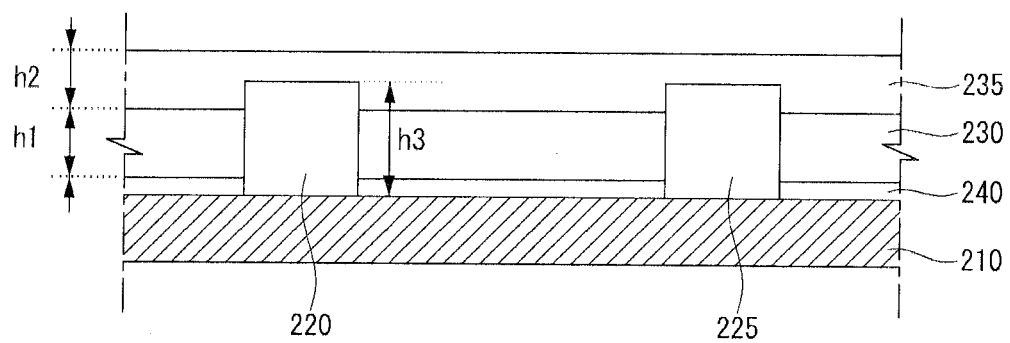

As shown in FIG. 25, a thickness h1 of the resin layer 230 may be less than a height h3 of the light source 220. Hence, the resin layer 230 may cover a portion of a lower part of the light source 220, and the resin layer 235 may cover a portion of an upper part of the light source 220.

The resin layer 230 may be formed of resin having a high adhesive strength. For example, an adhesive strength of the resin layer 230 may be greater than the resin layer 235. Hence, the light emitting surface of the light source 220 may be strongly attached to the resin layer 230, and a space between the light emitting surface of the light source 220 and the resin layer 230 may not be formed.

In the embodiment of the invention, the resin layer 230 may be formed of silicon-based resin having a high adhesive strength, and the resin layer 235 may be formed of acrylic resin. In this case, the refractive index of the resin layer 230 may be greater than the refractive index of the resin layer 235, and each of the resin layers 230 and 235 may have the refractive index of approximately 1.4 to 1.6. Further, a thickness h2 of the resin layer 235 may be less than the height h3 of the light source 220.

Figure 26:
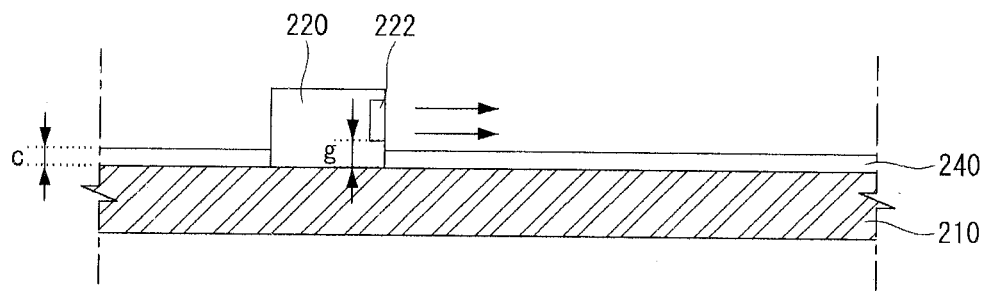

As shown in FIG. 26, because the reflection layer 240 is disposed at the side of the light source 220, a portion of light emitted from the light source 220 toward the side of the light source 220 may be incident on the reflection layer 240 and may be lost.

The loss of light emitted from the light source 220 decreases an amount of the light that is incident on the resin layer 230 and then passes through the resin layer 230. Hence, an amount of light incident on the display panel 110 from the backlight unit 200 may decrease. As a result, the luminance of the image displayed on the display device may be reduced.

Each of the light sources 220 may include a light emitting unit 222 (e.g., LED) emitting light. The light emitting unit 222 may be positioned at a location separated from the surface of the substrate 210 by a predetermined height "g".

The thickness "c" of the reflection layer 240 may be equal to or less than the height "g" of the light emitting unit 222. Hence, the light source 220 may be positioned above the reflection layer 240.

Accordingly, the thickness "c" of the reflection layer 240 may be approximately 0.02 mm to 0.08 mm. When the thickness "c" of the reflection layer 240 is equal to or greater than 0.02 mm, the reflection layer 240 may have a light reflectance within a reliable range. When the thickness "c" of the reflection layer 240 is equal to or less than 0.08 mm, the reflection layer 240 may cover the light emitting unit 222 of the light source 220. Hence, a loss of light emitted from the light source 220 may be prevented.

Accordingly, the thickness "c" of the reflection layer 240 may be approximately 0.02 mm to 0.08 mm, so that the reflection layer 240 improves an incident efficiency of light emitted from the light source 220 and reflects most of light emitted from the light source 220.

Figure 27:
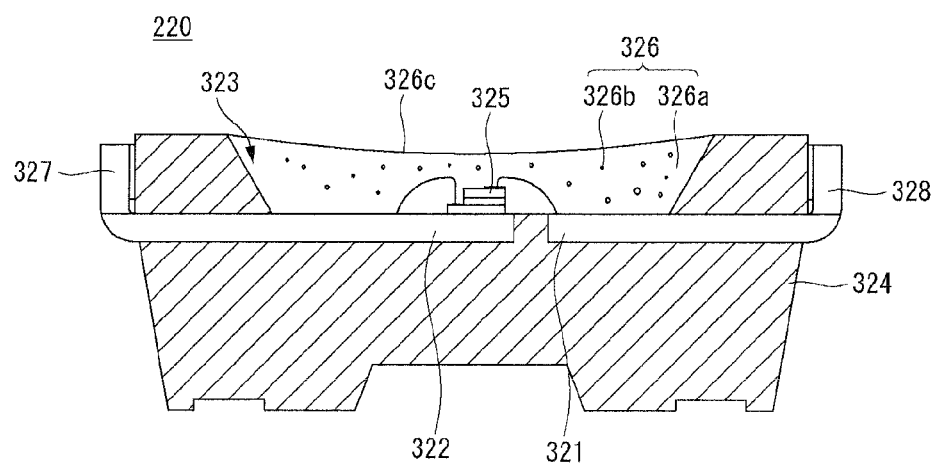
Figure 28:
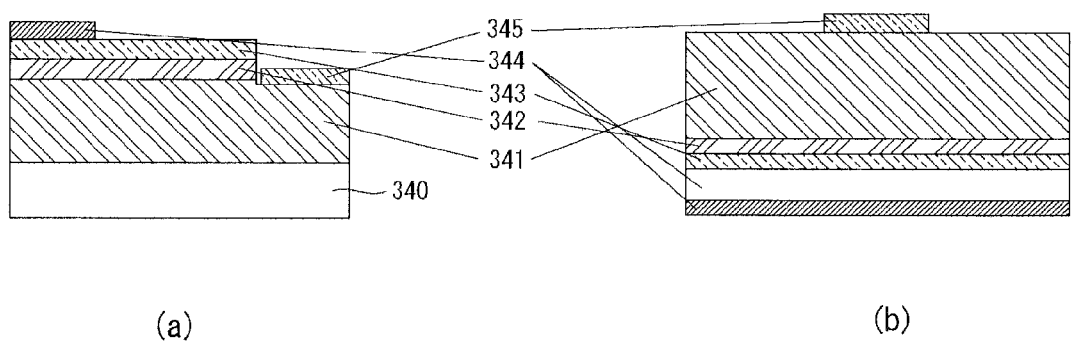
Figure 29:
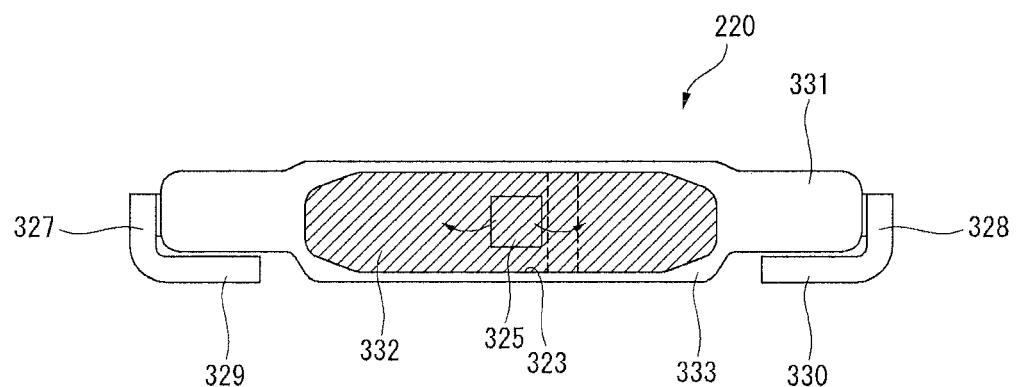

FIG. 27 illustrates an example of the structure of the light source when viewed from the side of the light source. FIG. 28 illustrates a horizontal type structure and a vertical type structure of the light emitting element 325. FIG. 29 illustrates a structure of the light source when viewed from the front of the light source.

As shown in FIG. 27, the light source 220 may include a plurality of lead frames 321 and 322, a mold part 324 having a cavity 323, a light emitting element 325 that is connected to the lead frames 321 and 322 and is mounted in the cavity 323, and an encapsulation material 326 for filling the cavity 323 in which the light emitting element 325 is mounted.

The light emitting element 325 may be a light emitting diode (LED) chip. The LED chip may be configured by a blue LED chip or an infrared LED chip or may be configured by at least one of a red LED chip, a green LED chip, a blue LED chip, a yellow green LED chip, and a white LED chip or a combination thereof.

The light emitting element 325 may be classified into a horizontal type light emitting element and a vertical type light emitting element depending on its structure.

As shown in FIG. 28($a$), the horizontal type light emitting element may be positioned on a substrate 340. The substrate 340 may be a single crystal substrate formed of sapphire, spinel, silicon carbide, zinc oxide, magnesium oxide, GaN, AlGaN, AlN, NGO ($NdGaO_3$), LGO ($LiGaO_2$), LAO ($LaAlO_3$), etc.

An n-type semiconductor layer 341 may be positioned on the substrate 340 and may be formed of, for example, n-GaN. An active layer 342 may be positioned on the n-type semiconductor layer 341 and may be formed of, for example, InGaN. A p-type semiconductor layer 343 may be positioned on the active layer 342 and may be formed of, for example, p-GaN. A p-type electrode 344 may be positioned on the p-type semiconductor layer 343 and may contain at least one of chromium (Cr), nickel (Ni), and gold (Au). An n-type electrode 345 may be positioned on the n-type semiconductor layer 341 and may contain at least one of chromium (Cr), nickel (Ni), and gold (Au).

As shown in FIG. 28($b$), the vertical type light emitting element may have the structure in which the p-type electrode 345, the n-type semiconductor layer 341, the active layer 342, and the p-type semiconductor layer 343 are sequentially stacked on the n-type electrode 344.

In the light emitting element shown in FIGS. 28($a$) and 28($b$), when a voltage is applied to the p-type electrode 344 and the n-type electrode 345, holes and electrons are combined on the active layer 342. The light emitting element shown in FIGS. 28($a$) and 28($b$) may operate by emitting light energy corresponding to a height difference (i.e., an energy gap) between a conduction band and a valence band.

Referring again to FIG. 27, the light emitting element 325 may be packaged in the mold part 324 constituting a body of the light source 220. For this, the cavity 323 may be formed at one side of the center of the mold part 324. The mold part 324 may be injection-molded with a resin material such as polyphtalamide (PPA) to a press (Cu/Ni/Ag substrate), and the cavity 323 of the mold part 324 may serve as a reflection cup. The shape or structure of the mold part 324 may be changed and is not limited thereto.

Each of the lead frames 321 and 322 may penetrate the mold part 324 in a long axis direction of the mold part 324. Ends 327 and 328 of the lead frames 321 and 322 may be exposed to the outside of the mold part 324. Herein, when viewed from the bottom of the cavity 323 where the light emitting element 325 is disposed, a long-direction symmetrical axis of the mold part 324 is referred to as a long axis and a short-direction symmetrical axis of the mold part 324 is referred to as a short axis.

A semiconductor device such as a light receiving element and a protection element may be selectively mounted on the lead frames 321 and 322 in the cavity 323 along with the light emitting element 325. That is, the protection device such as a zener diode for protecting the light emitting element 325 from electrostatic discharge (ESD) may be mounted on the lead frames 321 and 322 along with the light emitting element 325.

The light emitting element 325 may attach to any one lead frame (for example, the lead frame 322) positioned on the bottom of the cavity 323, and then may be bonded by wire bonding or flip chip bonding.

After the light emitting element 325 is connected inside the cavity 323, a mounting area may be filled with the encapsulation material 326. The encapsulation material 326 may include a liquid resin 326$a$ and a phosphor 326$b$. The liquid resin 326$a$ may be silicon or an epoxy material and may be a transparent material. A color of the phosphor 326$b$ depends on a color of light that the light emitting element 325 emits. For example, when the light emitting element 325 emits blue light, the phosphor 326$b$ may be yellow.

At least one side of the cavity 323 may be inclined, and the inclined side of the cavity 323 may serve as a reflection surface or a reflection layer for selectively reflecting incident light. The cavity 323 may have a polygonal exterior shape and may have other shapes other than a polygonal shape.

As shown in FIG. 29, a head part 331 of each light source 220 corresponding to a light emitting part may include a light emitting surface 332, from which light is actually emitted, and a non-emitting surface 333, which is a surface other than the light emitting surface 332 and does not emit light.

More specifically, the light emitting surface 332 of the head part 331 of the light source 220 may be formed by the mold part 324 and may be defined by the cavity 323 in which the light emitting element 325 is positioned. For example, the light emitting element 325 may be disposed in the cavity 323 of the mold part 324, and light emitted from the light emitting element 325 may be emitted through the light emitting surface 332 surrounded by the mold part 324. Further, the non-emitting surface 333 of the head part 331 of the light source 220 may be a portion where the mold part 324 is formed and the light is not emitted.

Further, the light emitting surface 332 of the head part 331 of the light source 220 may have a shape in which a transverse length is longer than a longitudinal length. Other shapes may be used for the light emitting surface 332 of the head part 331. For example, the light emitting surface 332 may have a rectangular shape.

In addition, the non-emitting surface 333 of the light source 220 may be positioned at upper, lower, left, or right side of the light emitting surface 332 of the head part 331 of the light source 220.

The ends 327 and 328 of the lead frames 321 and 321 may be first formed to extend to the outside of the mold part 324 and then may be secondly formed in one groove of the mold part 324. Hence, the ends 327 and 328 may be disposed in first and second lead electrodes 329 and 330. Herein, the number of forming operations may vary.

The first and second lead electrodes 329 and 330 of the lead frames 321 and 322 may be formed to be received in grooves formed at both sides of the bottom of the mold part 324. Further, the first and second lead electrodes 329 and 330 may be formed to have a plate structure of a predetermined shape and may have a shape in which solder bonding is easily performed in surface mounting.

The light sources 220 having the above-described configuration may be disposed on the backlight unit 200.

Figure 30:
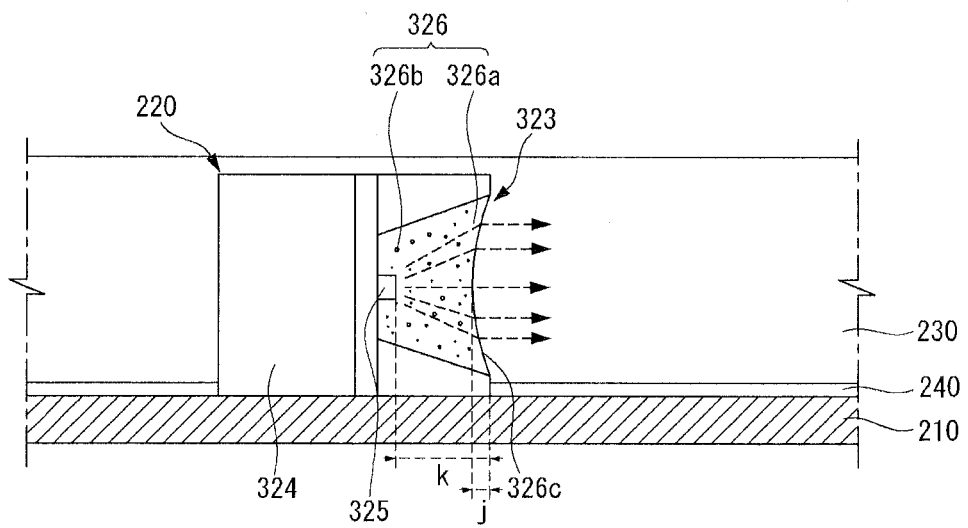

As shown in FIG. 30, the light sources 220 may be positioned on the substrate 210, and the reflection layer 230 may be positioned on the substrate 210 on which the light sources 220 are not positioned. Further, the resin layer 230 may be positioned on the substrate 210 to cover the light sources 220 and the reflection layer 230.

The light sources 220 on the substrate 210 may include the plurality of lead frames 321 and 322, the mold part 324 having a cavity 323, the light emitting element 325 that is connected to the lead frames 321 and 322 and is mounted in the cavity 323, and the encapsulation material 326 for filling the cavity 323 in which the light emitting element 325 is mounted.

In particular, the encapsulation material 326 may include the liquid resin 326a and the phosphor 326b and may be positioned in the cavity 323. The encapsulation material 326 may protect the light emitting element 325 and may convert a color of light emitted from the light emitting element 325. A surface 326c of the encapsulation material 326 may have a concave lens shape with respect to an upper part of the cavity 323. The surface 326c of the encapsulation material 326 may indicate an area where light emitted from the light emitting element 325 is emitted to the outside of the encapsulation material 326. A refractive index of light emitted from the light emitting element 325 may vary depending on a shape of the surface 326c of the encapsulation material 326.

In the embodiment of the invention, because the surface 326c of the encapsulation material 326 has the concave lens shape with respect to the upper part of the cavity 323, light emitted from the light emitting element 325 may be refracted by the surface 326c of the encapsulation material 326 and may travel in a direction parallel to the substrate 210.

As described above, light emitted from the light sources 220 of the backlight unit 200 according to the embodiment of the invention has to reach the light source 220 adjacent to each light source 220. Referring to FIG. 3, light emitted from one light source 220 has to reach another light source 200 adjacent to the one light source 220 in an emitting direction of the light. Hence, the backlight unit 200 may provide light with the uniform luminance.

Accordingly, in the embodiment of the invention, because light emitted from the light emitting element 325 is refracted by the surface 326c of the encapsulation material 326 and travels in the direction parallel to the substrate 210, light emitted from one light source 220 is directed towards the neighboring light source 220. As a result, the backlight unit 200 may provide light with the uniform luminance.

The concave lens-shaped surface 326c of the encapsulation material 326 may have a predetermined concave depth depending on the optical characteristics. For example, a concave depth "j" of the surface 326c of the encapsulation material 326 may approximately occupy 1% to 30% of a depth "K" ranging from the top of the light emitting element 325 to the top of the cavity 323.

When an occupying percentage of the concave depth "j" of the surface 326c is equal or greater than 1% of the depth "K", light emitted from the light emitting element 325 may be refracted by the surface 326c of the encapsulation material 326 and may travel in the direction parallel to the substrate 210. Hence, light emitted from the light source 220 may reach the neighboring light source 220, and the backlight unit 200 may provide light with the uniform luminance. Further, when the occupying percentage of the concave depth "j" of the surface 326c is equal or less than 30% of the depth "K", the surface 326c may serve as a buffer so that the phosphor 326b may convert a color of light emitted from the light emitting element 325 into another color. Hence, various colors of light may be sufficiently achieved. For example, when the light emitting element 325 emits blue light and the phosphor 326b is yellow, the light source 220 may emit white light because of the blue light and the yellow phosphor 326b.

As shown in FIG. 30, the resin layer 230 may be formed on the light source 220 to cover the light source 220. In particular, the surface 326c of the encapsulation material 326 of the light source 220 may contact the resin layer 230. The resin layer 230 formed of a resin may have a predetermined adhesive strength. When the surface 326c of the encapsulation material 326 of the light source 220 has the concave lens shape, an attachable effective area of the surface 326c of the encapsulation material 326 attached to the resin layer 230 may increase. Accordingly, an adhesive area between the resin layer 230 formed of the resin and the surface 326c of the encapsulation material 326 may increase, and an adhesive strength between the resin layer 230 and the surface 326c of the encapsulation material 326 may increase.

As described above, in the embodiment of the invention, because the surface 326c of the encapsulation material 326 of the light source 220 has the concave lens shape, the linearity of light emitted from the light source 220 may be improved so that the light may reach the adjacent light source 220. Further, because the an adhesive area between the encapsulation material 326 and the resin layer 230 increases, the adhesive strength between the encapsulation material 326 and the resin layer 230 may increase.

Figure 31:
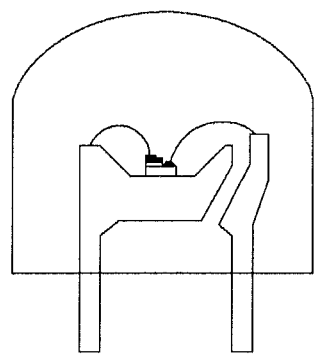
Figure 31:
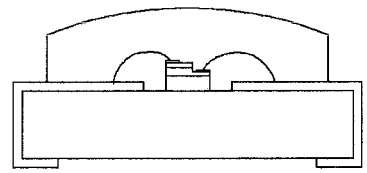
Figure 31:
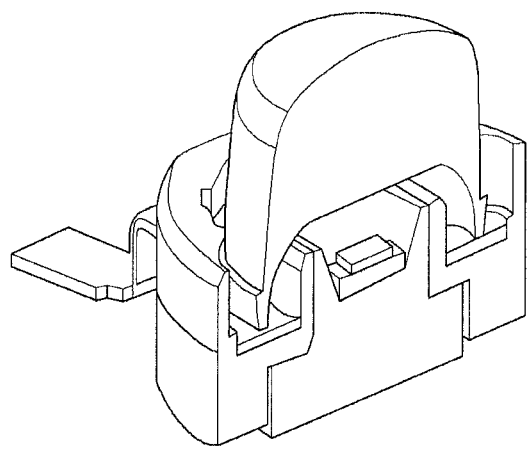

As shown in FIG. 31, the light source 220 may be classified into a lead type light source, a SMD type light source, and a flip-chip type light source based on a packaging form of the LED chip. The lead type, SMD type, and flip-chip type light sources may be applied to the embodiment of the invention. Other types may be used.

Figure 32:
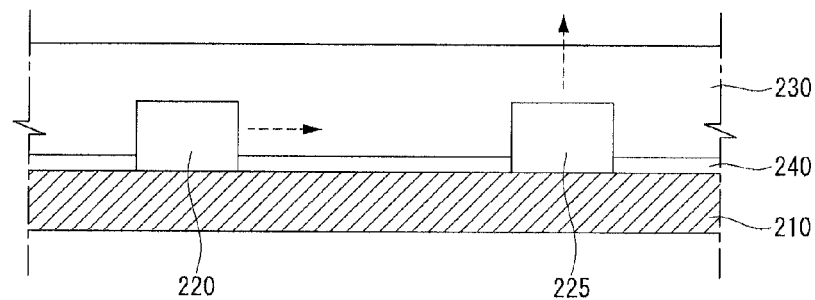

As shown in FIG. 32, a first light source 220 and a second light source 225 of the plurality of light sources 220 of the backlight unit 200 may emit light in different directions.

For example, the first light source 220 may emit light in the lateral direction. For this, the first light source 220 may be configured using the side view type LED package. The second light source 225 may emit light in the upward direction. For this, the second light source 225 may be configured using the top view type LED package. In other words, the plurality of light sources 220 of the backlight unit 200 may be configured by combining the side view type LED packages and the top view type LED packages.

As described above, because the backlight unit 200 is configured by combining two or more light sources that emit light in different directions, an increase and a reduction in the luminance of light in a predetermined area may be prevented. As a result, the backlight unit 200 may provide light with the uniform luminance to the display panel 110.

In FIG. 32, the embodiment of the invention is described using a case where the first light source 220 emitting the light in the lateral direction and the second light source 225 emitting the light in the upward direction are disposed adjacent to each other as an example, but the invention is not limited thereto. For example, the side view type light sources may be disposed adjacent to each other or the top view type light sources may be disposed adjacent to each other.

Figure 33:
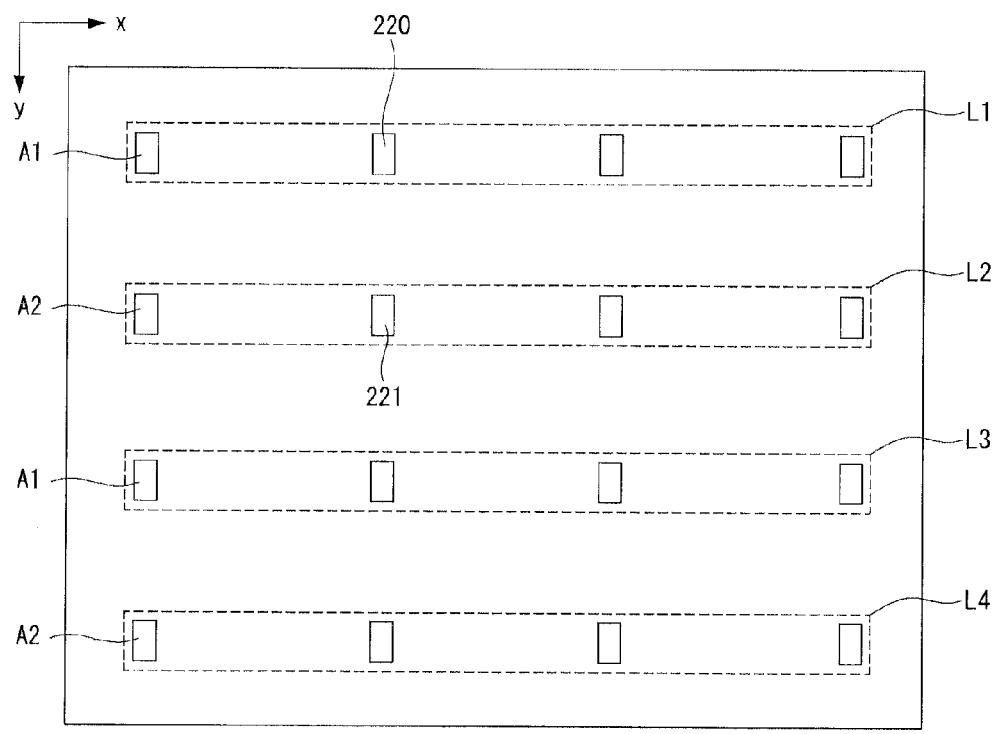

As shown in FIG. 33, the plurality of light sources 220 and 221 of the backlight unit 200 may be divided into a plurality of arrays, for example, a first light source array A1 and a second light source array A2.

Each of the first light source array A1 and the second light source array A2 may include a plurality of light source lines each including light sources. For example, the first light source array A1 may include a plurality of light source lines L1 each including at least two light sources, and the second light source array A2 may include a plurality of light source lines L2 each including at least two light sources.

The plurality of light source lines L1 of the first light source array A1 and the plurality of light source lines L2 of the second light source array A2 may be alternately disposed so as to correspond to the display area of the display panel 110.

In the embodiment of the invention, the first light source array A1 may include odd-numbered light source lines each including at least two light sources from the top of the plurality of light source lines, and the second light source array A2 may include even-numbered light source lines each including at least two light sources from the top of the plurality of light source lines.

In the embodiment of the invention, the backlight unit 200 may be configured so that a first light source line L1 of the first light source array A1 and a second light source line L2 of the second light source array A2 are disposed adjacent to each other up and down and the first light source line L1 and the second light source line L2 are alternately disposed.

Further, the light source 220 of the first light source array A1 and the light source 221 of the second light source array A2 may emit light in the same direction or in different directions.

Figure 34:
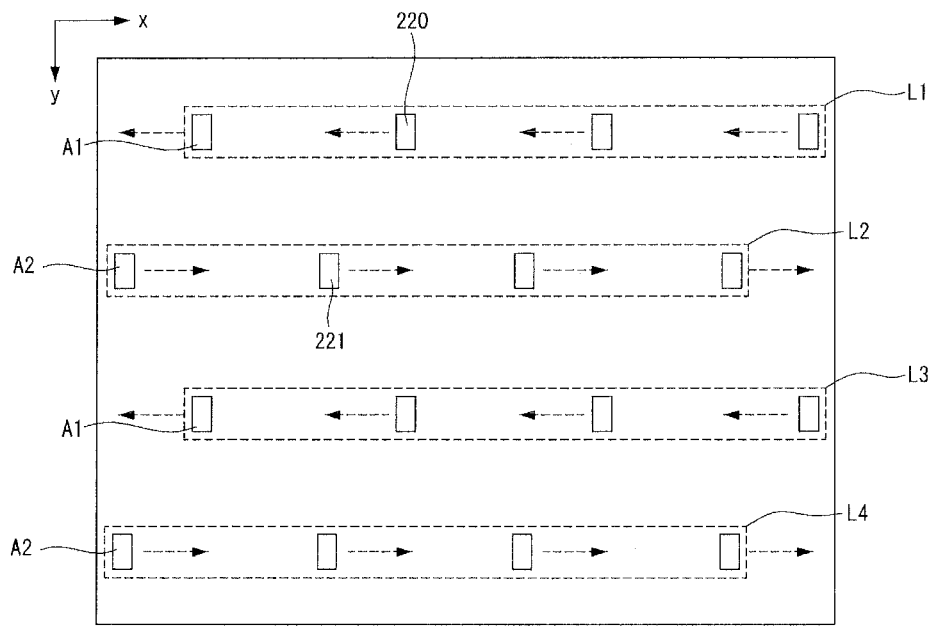

As shown in FIG. 34, the backlight unit 200 may include two or more light sources that emit light in different directions.

In other words, the light sources 220 of the first light source array A1 and the light sources 221 of the second light source array A2 may emit light in different directions. For this, a facing direction of light emitting surfaces of the light sources 220 of the first light source array A1 face may be different from a facing direction of light emitting surfaces of the light sources 221 of the second light source array A2.

More specifically, the light emitting surface of the first light source 220 of the first light source array A1 and the light emitting surface of the second light source 221 of the second light source array A2 may face in opposite directions or substantially opposite directions. For example, the first light source 220 of the first light source array A1 and the second light source 221 of the second light source array A2 may emit light in opposite directions or substantially opposite directions. In this case, each of the light sources of the backlight unit 200 may emit light in the lateral direction and may be configured by using the side view-type LED package.

The plurality of light sources of the backlight unit 200 may be disposed while forming two or more lines. Two or more light sources on the same line may emit light in the same direction. For example, light sources adjacent to right and left sides of the first light source 220 may emit light in the same direction as the first light source 220, i.e., in the opposite direction of the x-axis direction. Light sources adjacent to right and left sides of the second light source 221 may emit light in the same direction as the second light source 221, i.e., in the x-axis direction.

As described above, the light sources (for example, the first light source 220 and the second light source 221) disposed adjacent to each other in a y-axis direction may be configured so that their light emitting directions are opposite to each other. Hence, the luminance of light emitted from the light sources may be prevented from being increased or reduced in a predetermined area of the backlight unit 200.

For instance, because the light emitted from the first light source 220 travels toward the light source adjacent to the first light source 220, a luminance of light may be reduced. As a result, the luminance of the light, which is emitted from the first light source 220, travels to an area distant from the first light source 220, and is emitted from the area in a direction of the display panel 110, may be reduced.

Accordingly, because the first light source 220 and the second light source 221 emit light in the opposite directions in the embodiment of the invention, a luminance of light emitted from the first light source 220 and the second light source 221 may be complementarily prevented from increasing in the area adjacent to the light source and from being reduced in the area distant from the light source. Hence, the luminance of light provided by the backlight unit 200 may be uniformized.

Further, the light sources of the first light source line L1 of the first light source array A1 and the light sources of the second light source line L2 of the second light source array A2 may not be disposed in a straight line in a vertical direction and may be staggered in the vertical direction. As a result, the uniformity of light emitted from the backlight unit 200 can be improved. That is, the first light source 220 of the first light source array A1 and the second light source 221 of the second light source array A2 may be disposed adjacent to each other in a diagonal direction or in a staggered manner.

Figure 35:
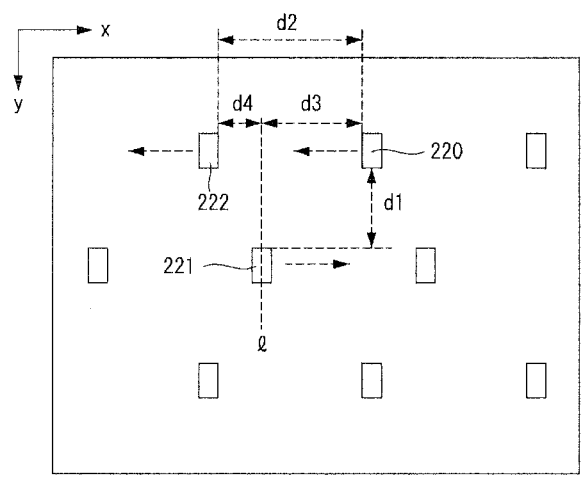

As shown in FIG. 35, two vertically adjacent light source lines (for example, the first and second light source lines L1 and L2) respectively included in the first and second light source arrays A1 and A2 may be separated from each other by a predetermined distance d1. In other words, the first light source 220 of the first light source array A1 and the second light source 221 of the second light source array A2 may be separated from each other by the predetermined distance d1 based on the y-axis direction perpendicular to the x-axis being a light emitting direction.

As the distance d1 between the first and second light source lines L1 and L2 increases, an area which light emitted from the first light source 220 or the second light source 221 cannot reach may be generated. Thus, the luminance of light in the non-reach area may be greatly reduced. Further, as the distance d1 between the first and second light source lines L1 and L2 decreases, the light emitted from the first light source 220 and the light emitted from the second light source 221 may interfere with each other. In this case, the division driving efficiency of the light sources may be deteriorated.

Accordingly, the distance d1 between the adjacent light source lines (for example, the first and second light source lines L1 and L2) in a crossing direction of the light emitting direction may be approximately 5 mm to 22 mm, so as to uniformize the luminance of the light emitted from the backlight unit 200 while reducing the interference between the light sources.

Further, the third light source 222 included in the first light source line L1 of the first light source array A1 may be disposed adjacent to the first light source 220 in the light emitting direction. The first light source 220 and the third light source 222 may be separated from each other by a predetermined distance d2.

A light orientation angle θ from the light source and a light orientation angle θ' inside the resin layer 230 may satisfy the following Equation 1 in accordance with Snell's law. The angle α of FIG. 6 may be an example of the light orientation angle θ.

$$\frac{n1}{n2} = \frac{\sin\theta'}{\sin\theta}$$ [Equation 1]

Considering that a light emitting portion of the light source is an air layer (having a refractive index n1 of 1) and the orientation angle θ of light emitted from the light source is generally 60°, the light orientation angle θ' inside the resin layer 230 may have a value indicated in the following Equation 2 in accordance with the above Equation 1.

$$\sin\theta' = \frac{\sin 60°}{n2}$$ [Equation 2]

Further, when the resin layer 230 is formed of an acrylic resin such as polymethyl methacrylate (PMMA), the resin layer 230 has a refractive index of approximately 1.5. Therefore, the light orientation angle θ' inside the resin layer 230 may be approximately 35.5° in accordance with the above Equation 2.

As described with reference to the above Equations 1 and 2, the light orientation angle θ' of the light emitted from the light source in the resin layer 230 may be less than 45°. As a result, a travelling range of light emitted from the light source in the y-axis direction may be less than a travelling range of the light emitted from the light source in the x-axis direction.

Accordingly, the distance d1 between two adjacent light sources (for example, the first and second light sources 220 and 221) in a crossing direction of the light emitting direction may be smaller than the distance d2 between two adjacent light sources (for example, the first and third light sources 220 and 222) in the light emitting direction. As a result, the luminance of the light emitted from the backlight unit 200 can be uniformized.

Considering the distance d1 between the two adjacent light sources having the above-described range, the distance d2 between two adjacent light sources (for example, the first and third light sources 220 and 222) in the light emitting direction may be approximately 9 mm to 27 mm, so as to uniformize the luminance of the light emitted from the backlight unit 200 while reducing the interference between the light sources.

The second light source 221 of the second light source array A2 may be disposed between the adjacent first and third light sources 220 and 222 included in the first light source array A1.

That is, the second light source 221 may be disposed adjacent to the first light source 220 and the third light source 222 in the y-axis direction and may be disposed on a straight line l passing between the first light source 220 and the third light source 222. In this case, a distance d3 between the straight line l on which the second light source 221 is disposed and the first light source 220 may be greater than a distance d4 between the straight line l and the third light source 222.

Light emitted from the second light source 221 travels in the opposite direction to a light emitting direction of the third light source 222, and thus the luminance of light emitted toward the display panel 110 may be reduced in an area adjacent to the third light source 222.

Accordingly, in the embodiment of the invention, because the second light source 221 is disposed closer to the third light source 222 than to the first light source 220, the reduction in the luminance of light in the area adjacent to the third light source 222 may be compensated using an increase in the luminance of light in the area adjacent to the second light source 221.

At least one of the plurality of light sources 220 included in the backlight unit 200 may emit light in a direction slightly inclined to a horizontal direction (i.e., the x-axis direction).

Figure 36:
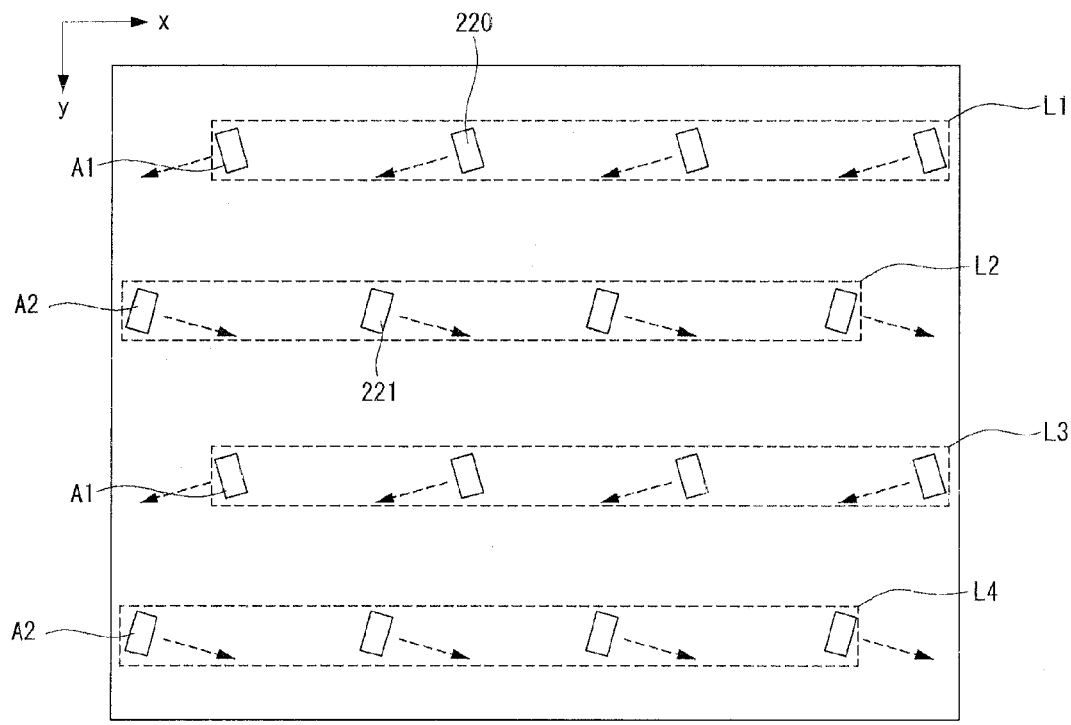

For example, as shown in FIG. 36, the light emitting surface of the light sources 220 and 221 may face upward or downward at a predetermined angle from the x-axis.

Figure 37:
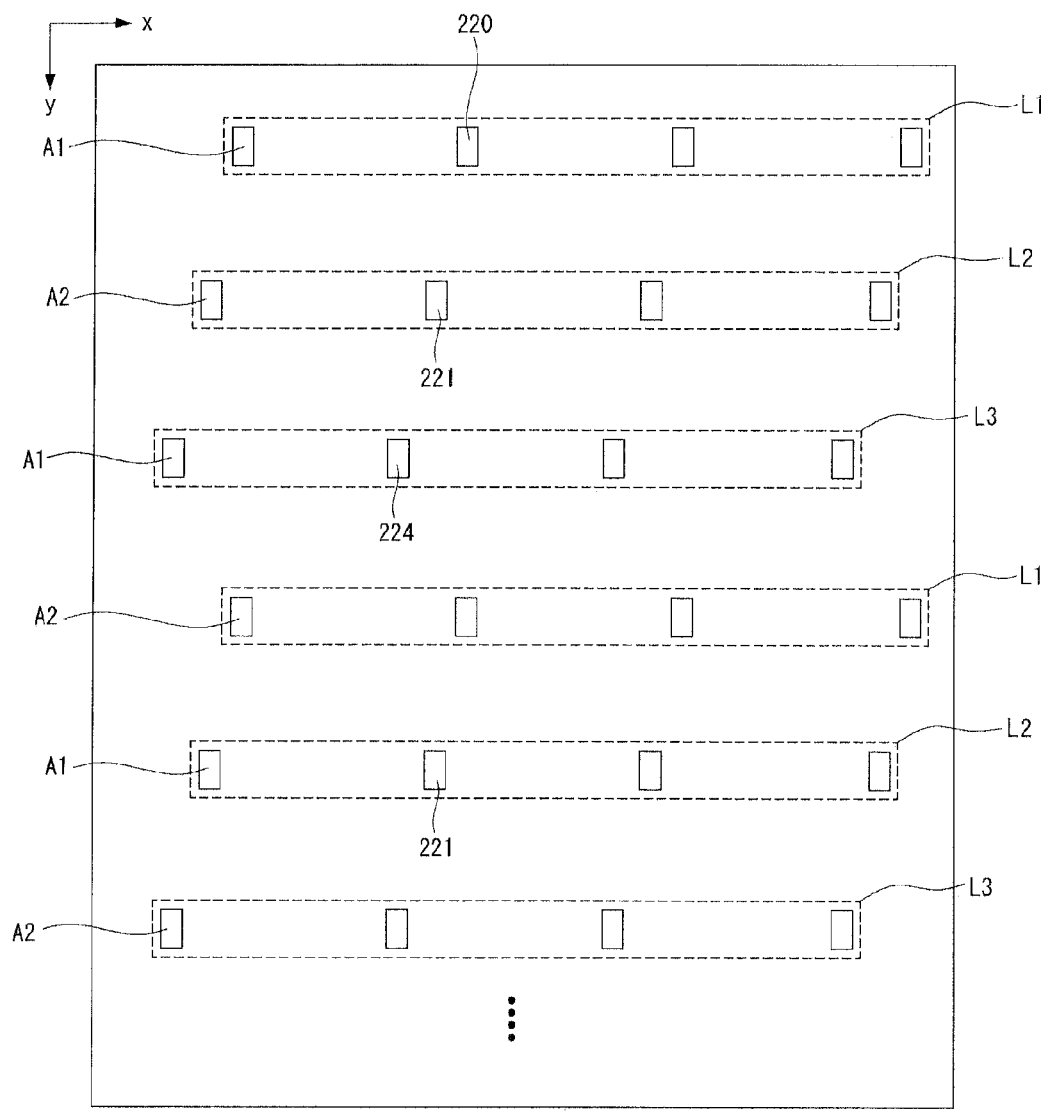

Further, as shown in FIG. 37, the light sources 220, 221, and 224 included in the light source lines L1, L2, and L3 may be staggered. For example, the light sources included in the light source lines L1, L3, and L2 of the first light source array A1 and the light sources included in the light source lines L2, L1, and L3 of the second light source array A2 may be staggered.

Accordingly, the light sources included in the light source lines L1, L3, and L2 of the first light source array A1 and the light sources included in the light source lines L2, L1, and L3 of the second light source array A2 may be alternatively disposed. Further, the light sources 220, 221, and 224 may be the same light source. However, the light sources 220, 221, and 224 may emit light in different directions or may have different characteristics, for example, the type, the size, and the direction, if desired.

Figure 38:
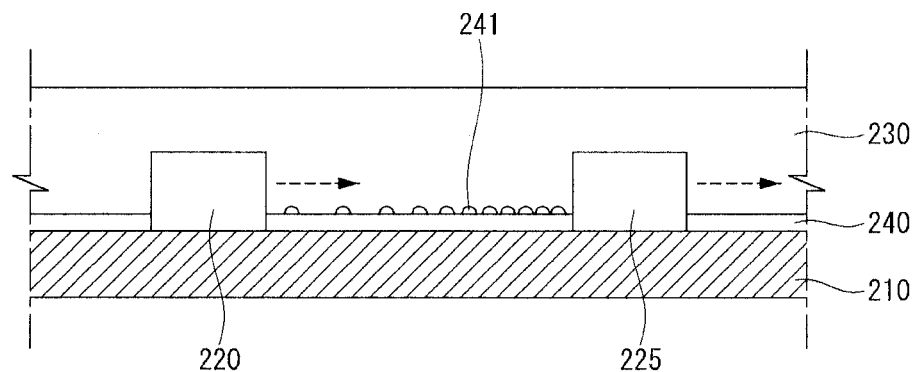

As shown in FIG. 38, the backlight unit according to the embodiment of the invention may further include a plurality of diffusion patterns 241 that allow light emitted from the light source 220 on the reflection layer 240 to easily travel to a light source 225 adjacent to the light source 220. The plurality of diffusion patterns 241 may diffuse or refract light emitted from the light source 220.

Figure 39:
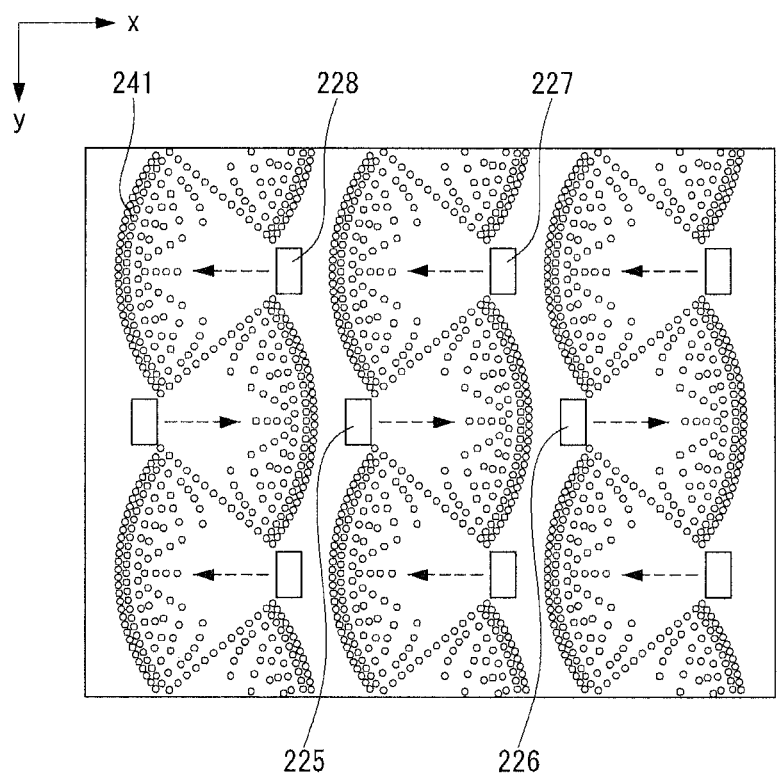

More specifically, as shown in FIG. 39, the backlight unit 200 according to the embodiment of the invention may further include at least two light sources, each of which emits light in a different direction. For example, the backlight unit 200 may include a first light source 225 and a second light source 226 that emit light in a direction parallel to the x-axis direction (i.e., in a lateral direction). The first light source 225 and the second light source 226 may be positioned adjacent to each other in the x-axis direction. The backlight unit 200 may further include a third light source 227 and a fourth light source 228 that are positioned perpendicular to the x-axis direction and emit light in the opposite direction of a light emitting direction of the first and second light sources 225 and 226. In other words, lines on which the first and second light sources 225 and 226 are arranged and lines on which the third and fourth light sources 227 and 228 are arranged may be arranged to cross one another.

Accordingly, because the light emitting direction of the first and second light sources 225 and 226 is opposite to the light emitting direction of the third and fourth light sources 227 and 228 in the embodiment of the invention, an increase or a reduction in the luminance of light in a predetermined area of the backlight unit 200 may be prevented. In this case, as light emitted from the first light source 225 travels to the second light source 226, a luminance of the light emitted from the first light source 225 may be reduced. Hence, a luminance of light, which is emitted from the first light source 225, travels to an area distant from the first light source 225, and is emitted from the area in a direction of the display panel, may be reduced.

Accordingly, the embodiment of the invention, the plurality of diffusion patterns 241 may be disposed between the first light source 225 and the second light source 226 to diffuse or refract light emitted from the first light source 225. Hence, the plurality of diffusion patterns 241 may allow the backlight unit 200 to provide light with the uniform luminance.

The diffusion patterns 241 may contain at least one of metal and metal oxide that are a reflection material. For example, the diffusion patterns 241 may contain metal or metal oxide having a high reflectance, such as aluminum (Al), silver (Ag), gold (Au), and titanium dioxide ($TiO_2$). In this case, the diffusion patterns 241 may be formed by depositing or coating the metal or the metal oxide on the substrate 210 or by printing a metal ink on the substrate 210. The deposition method may use a heat deposition method, an evaporation method, or a vacuum deposition method such as a sputtering method. The coating method or the printing method may use a gravure coating method or a silk screen method.

Further, the diffusion patterns 241 may have a color having the high brightness, for example, a color close to white so as to improve a reflection or refraction effect of the diffusion patterns 241.

The diffusion patterns 241 may include a plurality of dots formed of the above material. For example, the diffusion patterns 241 may include a plurality of dots having a circle plane shape, an oval plane shape, or a polygon plane shape.

A density of the diffusion patterns 241 may increase as the diffusion patterns 241 extend from the first light source 225 towards the second light source 226 as shown in FIGS. 38 and 39. Hence, a reduction in the luminance of light emitted upward from an area distant from the first light source 225 (i.e., an area around a back surface of the second light source 226) may be prevented. As a result, the luminance of light provided by the backlight unit 200 may be uniformized.

For example, a distance between the two adjacent diffusion patterns 241 each including the dots may increase as the diffusion patterns 241 extend from the light emitting surface of the first light source 225 to the second light source 226. Hence, while light emitted from the first light source 225 travels to the second light source 226, the light is diffused or refracted. As a result, the luminance of the light may be uniformized.

In particular, the diffusion patterns 241 may hardly exist in an area adjacent to the first light source 225. Hence, the light emitted from the first light source 225 is totally reflected by the reflection layer 240 in a non-formation area of the diffusion patterns 241 to travel and is diffused or refracted in a formation area of the diffusion patterns 241. As a result, the luminance of light in the entire area of the backlight unit 200 including an area adjacent to the second light source 226 may be uniformized.

The plurality of diffusion patterns 241 may be disposed between the third light source 227 and the fourth light source 228 that emit light in the opposite direction of the light emitting direction of the first and second light sources 225 and 226.

The density of the diffusion patterns 241 may increase as the diffusion patterns 241 extend from the light emitting surface of the third light source 227 to the fourth light source 228 in the same manner as the first and second light sources 225 and 226, so as to allow the light to propagate more evenly or uniformly through the area between the light sources. Further, a distance between the two adjacent diffusion patterns 241 among the plurality of diffusion patterns 241 between the third light source 227 and the fourth light source 228 may decrease as the diffusion patterns 241 extend from the light emitting surface of the third light source 227 to the fourth light source 228.

The third light source 227 is diagonally positioned across the first light source 225 in the light emitting direction of the first light source 225, and the plurality of diffusion patterns 241 may be disposed on a diagonal line between the first light source 220 and the second light source 221 in a line. Because the first and third light sources 225 and 227 emit light in the opposite directions, the luminance of light may increase in an overlapping area between light emitted from the first light source 225 and light emitted from the third light source 227. Thus, the plurality of diffusion patterns 241 disposed on the diagonal line between the first light source 225 and the third light source 227 may prevent an increase in the luminance of light in the overlapping area of light.

Accordingly, as shown in FIG. 39, a plane shape of the diffusion patterns 241 between the first and second light sources 225 and 226 may be symmetrical to a plane shape of the diffusion patterns 241 between the third and fourth light sources 227 and 228. For example, the plane shape of the diffusion patterns 241 between the first and second light sources 225 and 226 or between the third and fourth light sources 227 and 228 may be a fan shape.

Because the fan-shaped diffusion patterns 241 are disposed based on the orientation angle of about 200° of light emitted from the light source, the fan-shaped diffusion patterns 241 efficiently transfer and diffuse the light emitted from the light source. Hence, the entire luminance of light provided by the backlight unit may be uniformized.

Figure 40:
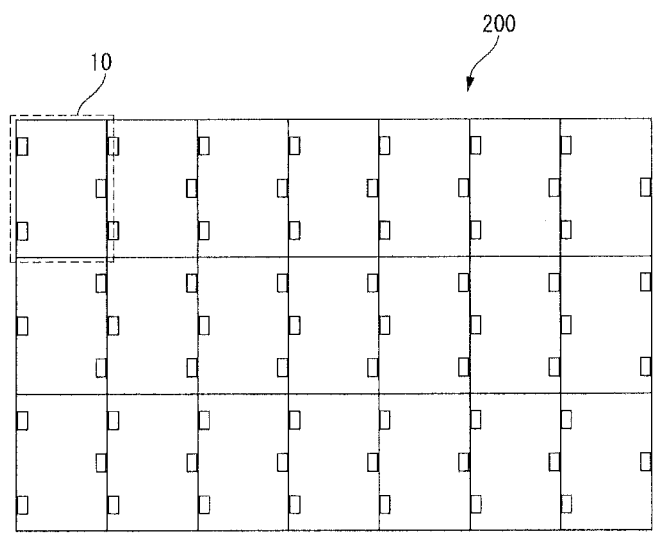

As shown in FIG. 40, the substrate 210, the plurality of light sources 220 on the substrate 210, the resin layer 230 covering the plurality of light sources 220, the reflection layer 240 on the substrate 210, and the plurality of diffusion patterns 241 on the reflection layer 240 may constitute an optical assembly 10 in the same manner as FIGS. 2-26 and 32-39. The backlight unit 200 may be configured using the plurality of optical assemblies 10.

The plurality of optical assemblies 10 constituting the backlight unit 200 may be arranged in a matrix structure of N×M, where N and M are a natural number equal to or greater than 2. For example, as shown in FIG. 40, 21 optical assemblies 10 of the backlight unit 200 may be arranged in a matrix structure of 7×3. Since the structure of the optical assemblies shown in FIG. 40 is an example, other matrix structures may be used based on the screen size of the display device.

For example, in the 47-inch display device, 240 optical assemblies having a matrix structure of 24×10 may constitute the backlight unit 200.

The optical assemblies 10 may be independently manufactured and may be positioned adjacent to one another, thereby forming a module type backlight unit. The module type backlight unit may provide light to the display panel 110.

The backlight unit 200 according to the embodiments of the invention may be driven in a full driving manner such as global dimming or a partial driving manner such as local dimming and impulsive driving. The backlight unit 200 may be driven in various driving manners depending on a circuit design. As a result, in the embodiment of the invention, a color contrast ratio can increase, and also the image quality can be improved because a bright image and a dark image may be clearly displayed on the screen of the display device.

In other words, the backlight unit 200 may be divided into a plurality of division driving regions (blocks) to selectively and independently operate each of the regions according to dimming and other operations. Each of these regions can be selectively and independently driven so that the light sources in one region may be turned on while the light sources in another region may be turned off, or vice versa. Further, the light sources in one region of the backlight unit may be dimmed while the light sources in another region of the backlight unit may emit brighter light. In an example, the backlight unit 200 may reduce a luminance of a dark image and increase a luminance of a bright image based on a relation between a luminance of each of the division driving regions and a luminance of a video signal, thereby improving the contrast ratio and the definition.

For example, some of the optical assemblies 10 may upward provide light by independently driving only some of the light sources 220. For this, the light sources 220 included in the each of the optical assemblies 10 may be independently controlled.

An area of the display panel 110 corresponding to one optical assembly 10 may be selectively and independently divided into two or more blocks. The display panel 110 and the backlight unit 200 may be separately driven in each block.

Because the plurality of optical assemblies 10 are assembled as described above to configure the backlight unit 200, a manufacturing process of the backlight unit 200 may be simplified and a manufacturing loss generated in the manufacturing process may be minimized. Hence, productivity of the backlight unit 200 may be improved. Further, the optical assemblies 10 may be applied to the backlight unit having various sizes by standardizing the optical assemblies 10 and mass-producing the standardized optical assemblies 10.

Furthermore, when one of the plurality of optical assemblies 10 of the backlight unit 200 is defective, only the defective optical assembly 10 (or that region) is replaced without replacing all of the optical assemblies 10 of the backlight unit 200. Therefore, a replacing work is easy and the part replacing cost is saved.

Figure 41:
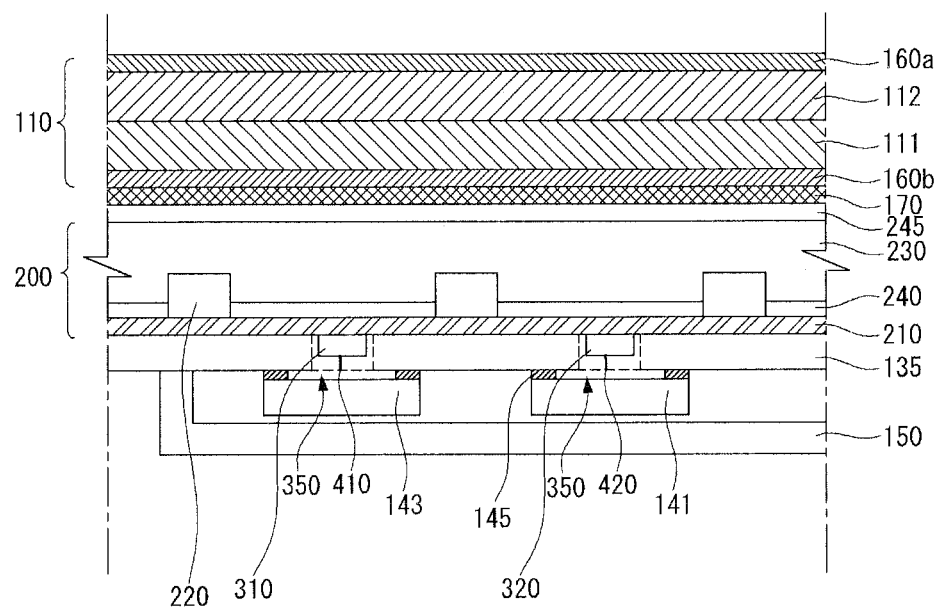

As shown in FIG. 41, the display panel 110 including a first substrate 111, a second substrate 112, an upper polarizing plate 160a, and a lower polarizing plate 160a may closely adhere to the backlight unit 200 including the substrate 210, the plurality of light sources 220, and the resin layer 230. For example, an adhesive layer 170 may be formed between the backlight unit 200 and the display panel 110 to adhesively fix the backlight unit 200 to the bottom of the display panel 110.

More specifically, the top of the backlight unit 200 may adhere to the bottom of the lower polarizing plate 160b using the adhesive layer 170. The backlight unit 200 may further include the diffusion plate 245 on the resin layer 230. A plurality of optical sheets (not shown) may be formed between the diffusion plate 245 and the adhesive layer 170.

Further, a frame 135 may be disposed on the bottom of the backlight unit 200 and may closely adhere to the bottom of the substrate 210.

The display device may include a display module, e.g., a driver for supplying a driving voltage and a power to the display panel 110 and the backlight unit 200. For example, the plurality of light sources 220 of the backlight unit 200 may be driven using the driving voltage supplied by the driver to emit light.

The driver may include a driving controller 141, a power supply unit 143, and a main board (not shown). The driver may be disposed and fixed on a driver chassis 145 positioned on the frame 135, so that the driver may be stably supported and fixed.

In the embodiment of the invention, a first connector 310 may be formed on the back surface of the substrate 210. For this, a hole 350 for inserting the first connector 310 may be formed in the frame 135.

The first connector 310 may electrically connect the power supply unit 143 to the light source 220. Hence, the driving voltage supplied by the power supply unit 143 may be supplied to the light source 220.

For example, the first connector 310 may be formed on the bottom of the substrate 210 and may be connected to the power supply unit 143 using a first cable 410. Hence, the first connector 310 may be used to transfer the driving voltage supplied by the power supply unit 143 through the first cable 410 to the light source 220.

An electrode pattern (not shown), for example, a carbon nanotube electrode pattern may be formed on the top of the substrate 210. The electrode formed on the top of the substrate 210 may contact the electrode formed in the light source 220 and may electrically connect the light source 220 with the first connector 310.

Further, the display device may include the driving controller 141 for controlling a drive of the display panel 110 and a drive of the backlight unit 200. For example, the driving controller 141 may be a timing controller.

The timing controller may control a driving timing of the display panel 110. More specifically, the timing controller may generate a control signal for controlling a driving timing of each of a data driver (not shown), a gamma voltage generator (not shown), and a gate driver (not shown) that are included in the display panel 110 and may supply the control signal to the display panel 110.

The timing controller may synchronize with a drive of the display panel 110 and may supply a signal for controlling driving timing of the light sources 220 to the backlight unit 200, so that the backlight unit 200, more specifically, the light sources 220 operate.

As shown in FIG. 41, the driving controller 141 may be fixed to the driver chassis 145 positioned on the frame 135, so that the driving controller 141 may be stably supported and fixed.

In the embodiment of the invention, a second connector 320 may be formed on the substrate 210. For this, a hole 350 for inserting the second connector 320 may be formed in the frame 135.

The second connector 320 may electrically connect the driving controller 141 with the substrate 210, thereby allowing a control signal output from the driving controller 141 to be supplied to the substrate 210.

For example, the second connector 320 may be formed on the bottom of the substrate 210 and may be connected to the driving controller 141 using a second cable 420. Hence, the second connector 320 may be used to transfer a control signal supplied by the driving controller 141 through the second cable 420 to the substrate 210.

A light source driver (not shown) may be formed on the substrate 210. The light source driver may drive the light sources 220 using the control signal supplied from the driving controller 141 through the second connector 320.

The driving controller 141 and the power supply unit 143 may be covered by a back cover 150 and may be protected from the outside.

The configuration of the display device shown in FIG. 41 is just one embodiment of the invention. Therefore, the location or the numbers of each of the driving controller 141, the power supply unit 143, the first and second connector 310 and 320, and the first and second cables 420 and 430 may be changed, if necessary.

FIGS. 42 to 46 illustrate a disposition relationship between a frame, a driver, and a back cover. Structures and components identical or equivalent to those illustrated in FIGS. 1 to 41 are designated with the same reference numerals, and a further description may be briefly made or may be entirely omitted.

Figure 42:
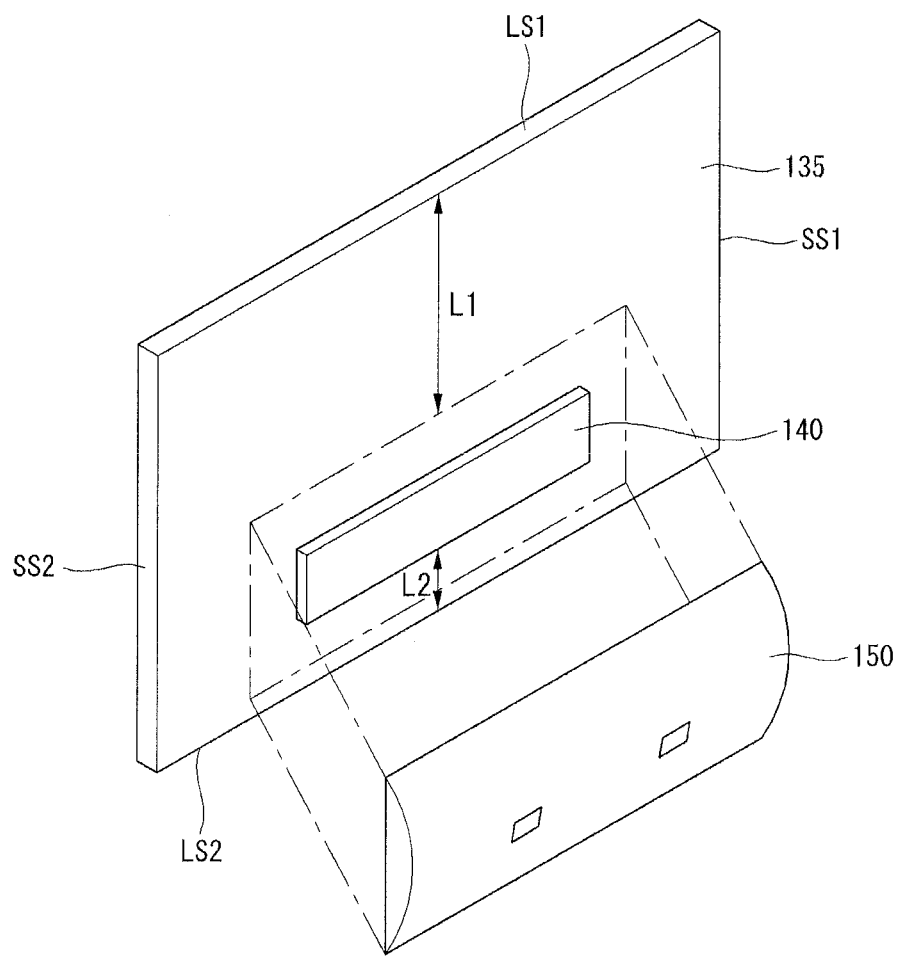
FIGS. 42 to 46 illustrate a disposition relationship between a frame, a driver, and a back cover.

As shown in FIG. 42, the driver 140 for operating the display panel 110 or supplying the driving signal to the backlight unit 200 may be positioned on the bottom of the frame 135. Further, the back cover 150 may not cover the entire area of the frame 135 and may cover a partial area of the frame 135.

In other words, the driver 140 may be positioned in a predetermined area of the frame 135, and the back cover 150 may be positioned in a predetermined area of the frame 135 at a location corresponding to the driver 140.

For example, as shown in FIG. 42, the frame 135 may have a rectangular plate shape, and the driver 140 may be positioned on a second long side LS2 of the frame 135.

In the embodiment of the invention, the second long side LS2 may be opposite to a first long side LS1 and may be positioned adjacent to a first short side SS1 and a second short side SS2. The first long side LS1 of the frame 135 may be referred to as a first region, and the second long side LS2 of the frame 135 may be referred to as a second region.

Figure 43:
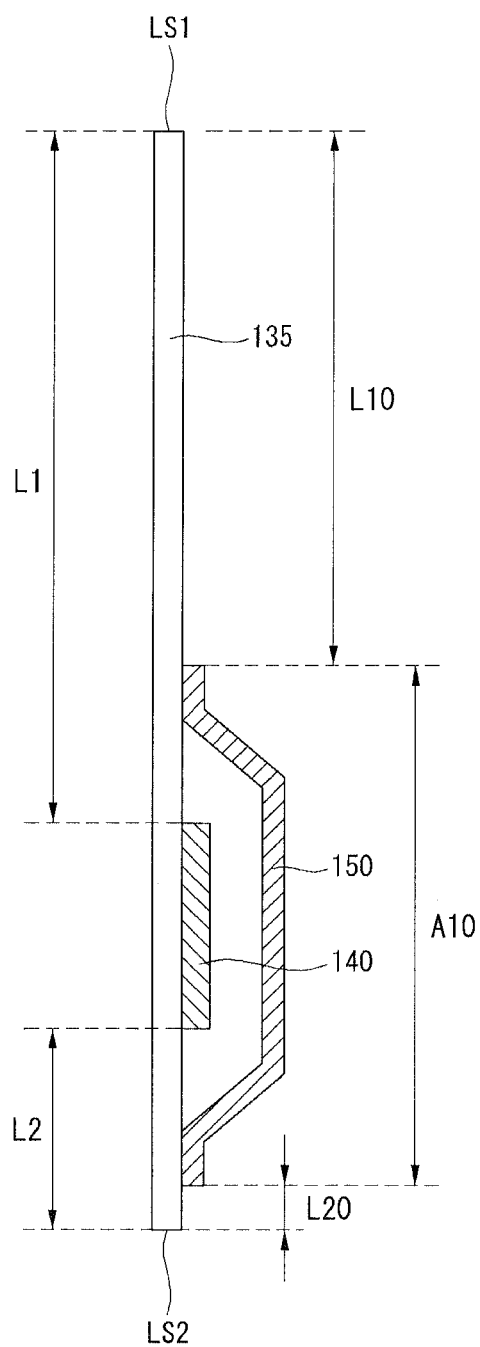

In this instance, as shown in FIGS. 42 and 43, a distance L1 between the first region LS1 of the frame 135 and the driver 140 may be longer than a distance L2 between the second region LS2 of the frame 135 and the driver 140. Further, a distance L10 between the first region LS1 of the frame 135 and the back cover 150 may be longer than a distance L20 between the second region LS2 of the frame 135 and the back cover 150.

The second region LS2 of the frame 135 may be adjacent to a support (not shown) for supporting the display panel 110.

As above, when the driver 140 positioned in the rear of the frame 135 is positioned adjacent to the second region LS2 of the frame 135, the back cover 150 may be positioned adjacent to the second region LS2 of the frame 135.

Further, the driver 140 may be positioned in an overlap area A10 between the frame 135 and the back cover 150.

When the driver 140 and the back cover 150 are positioned adjacent to the second region LS2 of the frame 135, the display panel 110, the backlight unit 200, and the front cover 130 are combined with one another.

Figure 44:
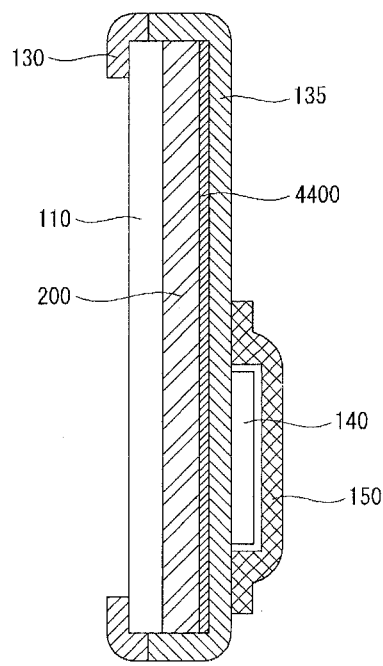

In the combined structure shown in FIG. 44, an adhesive layer 4400 may be positioned between the frame 135 and the backlight unit 200. In this instance, the backlight unit 200 may be closer to the frame 135.

Figure 45:
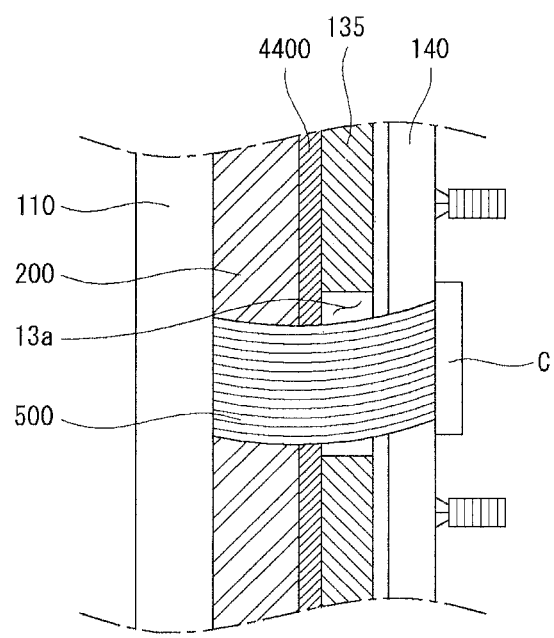

A connection relationship between the driver 140 and the display panel 110 is described with reference to FIGS. 45 and 46. FIG. 45 is a partial cross-sectional view illustrating the connection relationship, and FIG. 46 is a perspective view illustrating a combined state of the display device.

Figure 46:
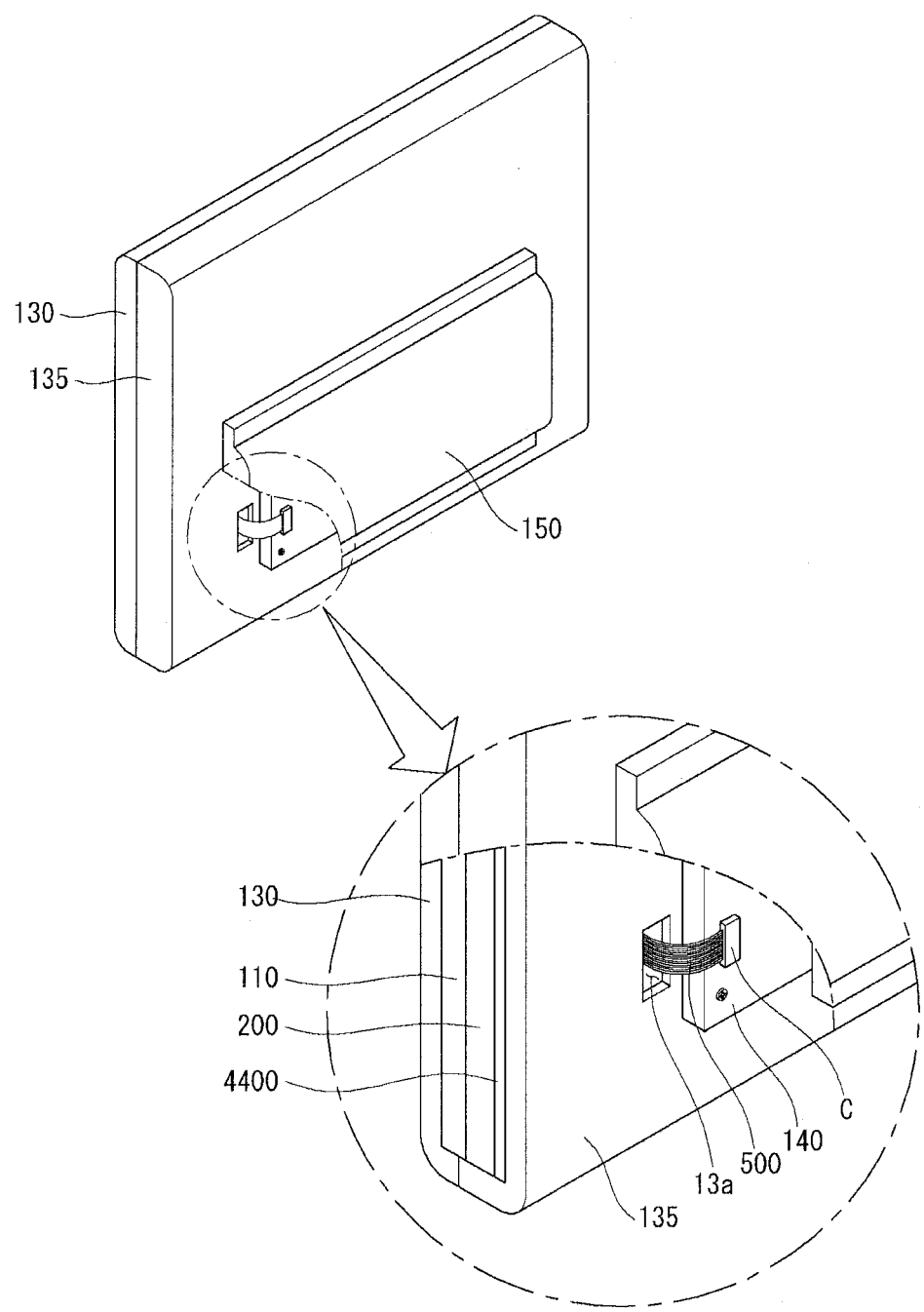

In FIGS. 45 and 46, an end of each of wires 500 is electrically connected to a switching element (not shown) provided on the lower substrate of the display panel 110. Other end of each wire 500 extends to the frame 135 via the side of the display panel 110 and/or the backlight unit 200.

A hole 13a is formed in the frame 135. The wires 500 pass through the hole 13a and extend to the outside of the display device.

The driver 140 is screw-combined with the back surface of the frame 135 around the hole 13a. Thus, the wires 500 passing through the hole 13a are connected to a connector C of the driver 140, and the driver 140 is connected to the lower substrate of the display panel 110.

The driver 140 is connected to the display panel 110 and/or the backlight unit 200 through the wires 500 and is fixed to the back surface of the frame 135. The driver 140 may be fixed to the back surface of the frame 135 using a screw.

The back cover 150 covers the driver 140 and is fixed to the frame 135, thereby protecting the driver 140 from an external impact.

FIGS. 47 to 54 illustrate a display device including a heat dissipation member. Structures and components identical or equivalent to those illustrated in FIGS. 1 to 46 are designated with the same reference numerals, and a further description may be briefly made or may be entirely omitted.

Figure 47:
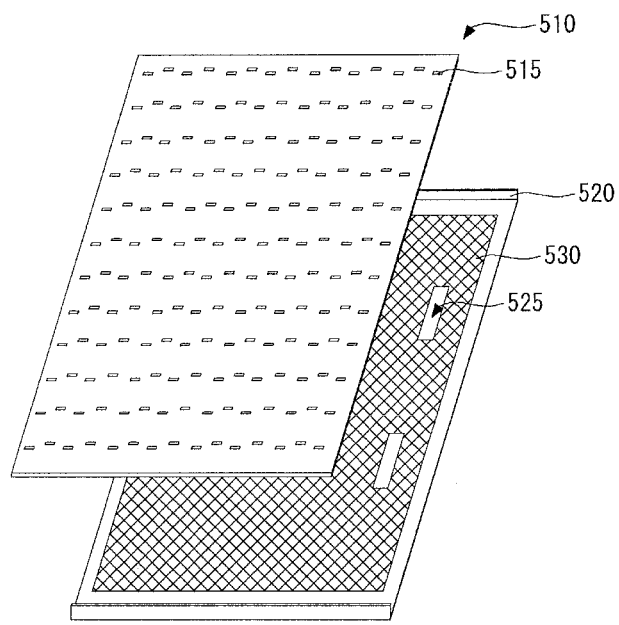
FIGS. 47 to 54 illustrate a display device including a heat dissipation member.
Figure 48:
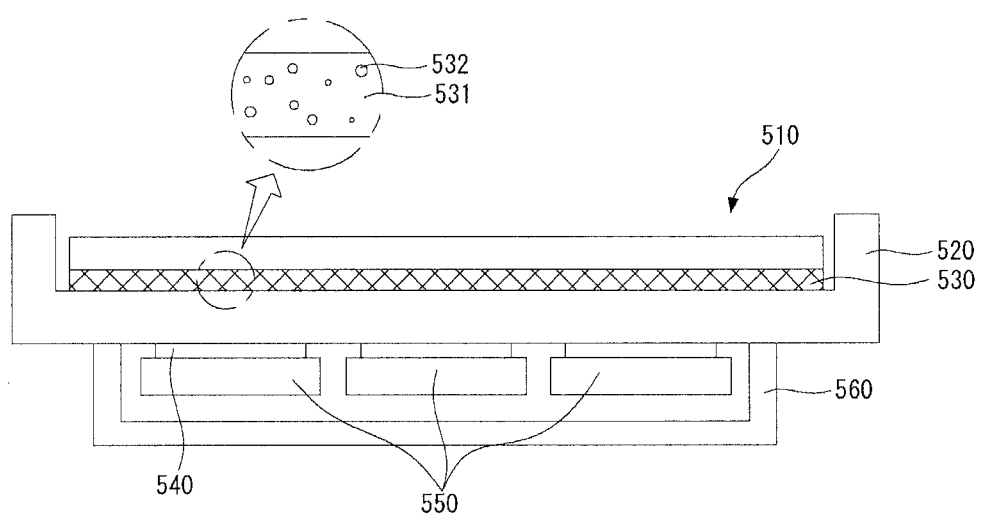

As shown in FIGS. 47 and 48, a display device according to the embodiment of the invention may include a frame 520 on which a backlight unit 510 is disposed, a driver chassis 540 that is positioned on a back surface of the frame 520 to fix the driver 550, and a back cover 560 covering the driver 550.

As described above, the backlight unit 510 may include a plurality of light sources 515 arranged in a predetermined form.

A plurality of holes 525 may be formed in the frame 520, so that the backlight unit 510 is connected to the driver 550 positioned on the back surface of the frame 520. A heat dissipation member 530 may be positioned between the backlight unit 510 and the frame 520 (i.e., the surface of the frame 520 opposite the backlight unit 510).

The heat dissipation member 530 may be formed in a sheet form by embedding metal beads 532 in a support layer 531. In other words, the metal beads 532 are embedded in the support layer 531 to form the heat dissipation sheet 530. Various forms of metal including a mesh or a powder in addition to the bead form may be used. Because the heat dissipation sheet 530 is manufactured in a roll form, the heat dissipation sheet 530 has the particle size suitable for the flexibility of the heat dissipation sheet 530 for the roll form.

The metal beads 532 of the heat dissipation member 530 are uniformly distributed into the support layer 531. The heat dissipation member 530 including the metal beads 532 is manufactured to be very thin. When the heat dissipation member 530 is thick, it is difficult to manufacture the heat dissipation member 530 of the roll form.

The support layer 531 may be formed using a thermoplastic resin such as vinyl acetate resin, polyvinyl alcohol resin, vinyl chloride resin, polyvinyl acetate resin, acrylic resin, saturated polyester resin, polyamide resin, and polyethylene resin. A reason to form the support layer 531 using the thermoplastic resin is to easily manufacturer the heat dissipation sheet 530 in the roll form.

The metal beads 532 may be formed of metal having high thermal conductivity, for example, gold (Au), silver (Ag), copper (Cu), and aluminum (Al). The heat generated in the light sources 515 of the backlight unit 510 or the heat generated by an operation of the driver 550 may be uniformly distributed into the heat dissipation member 530 through the metal beads 532 formed of metal having the high thermal conductivity.

The heat generated by the operation of the backlight unit 510 or the driver 550 may be uniformly distributed into the heat dissipation member 530 formed by embedding or inserting the metal beads 532 formed of metal having the high thermal conductivity into the support layer 531 formed of the thermoplastic resin. Hence, the heat dissipation effect of the display device may be improved.

The backlight unit 510 including the plurality of light sources 515 positioned adjacent to the frame 520 requires heat dissipation means for dissipating the heat generated in the light sources 515. In particular, because the backlight unit 510 is directly attached to the display panel 110 as shown in FIG. 41, the display panel 110 may be adversely affected by the heat generated in the backlight unit 510.

Accordingly, the display device according to the embodiment of the invention includes the heat dissipation member 530 between the backlight unit 510 and the frame 520, thereby increasing the heat dissipation effect of the backlight unit 510.

The heat dissipation member 530 manufactured in the sheet form may be attached to the frame 520. In this instance, an adhesive may be applied to one surface of the heat dissipation sheet 530, and the heat dissipation sheet 530 may be attached to the frame 520 using the adhesive.

FIGS. 47 and 48 illustrate one heat dissipation sheet 530 attached to the frame 520. However, the plurality of heat dissipation sheets 530 may be attached to the frame 520, and the plurality of heat dissipation sheets 530 each having a stripe shape may be attached to the frame 520.

Alternatively, the liquid heat dissipation member 530 may be applied to the frame 520. The liquid heat dissipation member 530 may be formed by inserting the metal beads 532 into the support layer 531 and then coating the metal beads 532.

Figure 49:
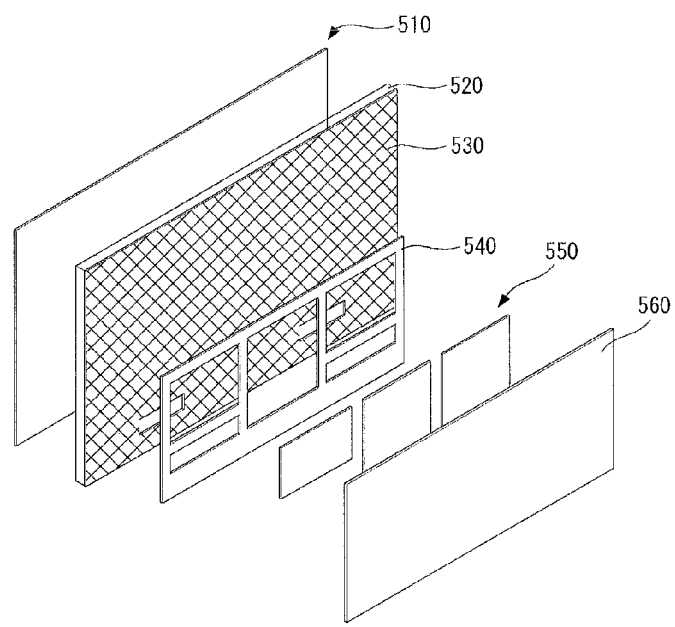
Figure 50:
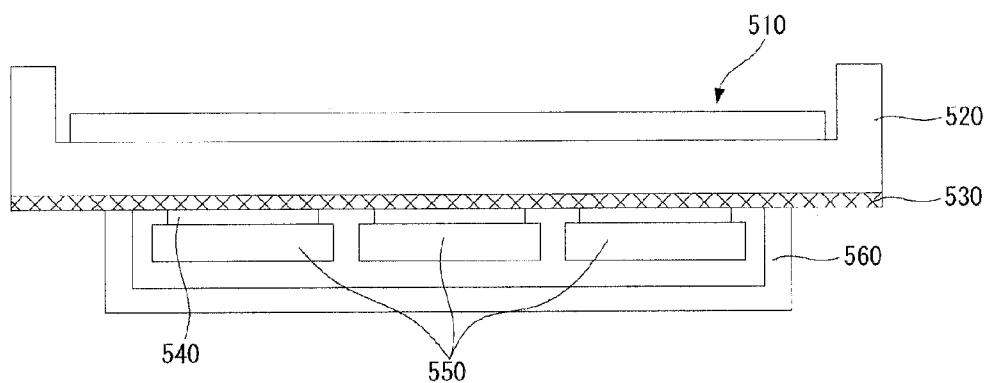

As shown in FIGS. 49 and 50, the heat dissipation member 530 according to the embodiment of the invention may be positioned between the frame 520 and the driver 550.

More specifically, the heat dissipation member 530 may be positioned on the back surface of the frame 520. The frame 520 may be formed of a conductive material, for example, aluminum. Because the backlight unit 510 received in the frame 520 is positioned close to one surface of the frame 520, the heat generated in the light sources of the backlight unit 510 may be transferred to the frame 520. Accordingly, the heat dissipation effect of the backlight unit 510 may be improved through the heat dissipation member 530 positioned on the back surface of the frame 520.

The driver 550 may be positioned on the frame 520 using the driver chassis 540 and requires an element for dissipating the heat generated when the driver 550 is driven. Accordingly, in the embodiment of the invention, the heat dissipation member 530 may be positioned on the back surface of the frame 520 adjacent to the driver 550, thereby improving the heat dissipation effect of the driver 550 as well as the backlight unit 510.

Figure 51:
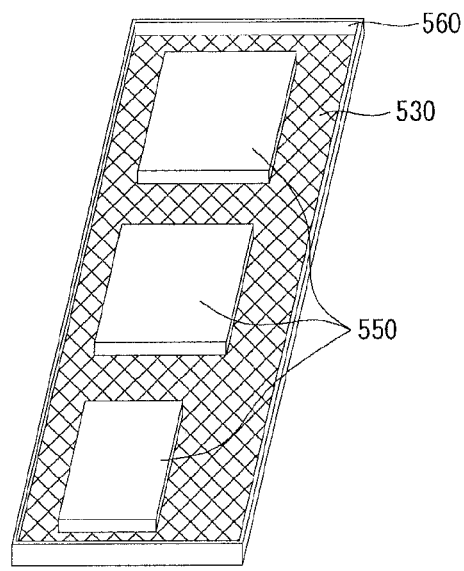
Figure 52:
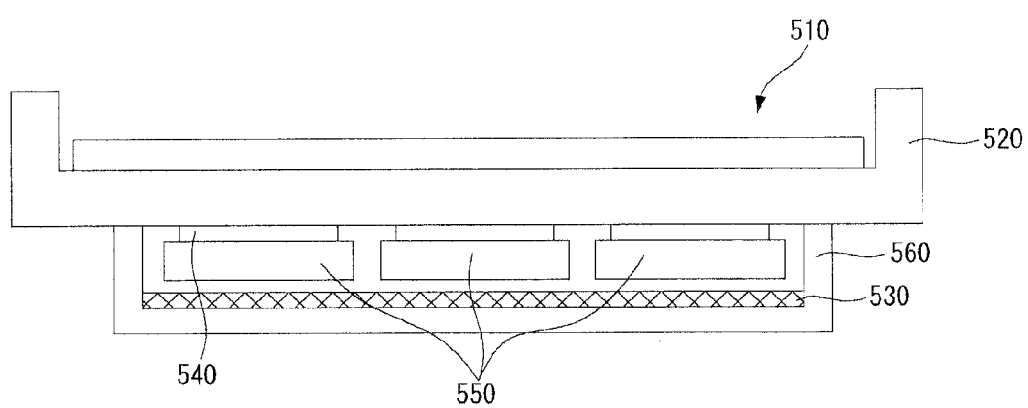

As shown in FIGS. 51 and 52, the heat dissipation member 530 according to the embodiment of the invention may be positioned between the driver 550 and the back cover 560.

More specifically, the heat dissipation member 530 may be positioned on one surface of the back cover 560, i.e., on one surface of the back cover 560 opposite the driver 550. The driver 550 requires an element for dissipating the heat generated when the driver 550 covered by the back cover 560 is driven.

In particular, in the embodiment of the invention, when the heat generated in the driver 550 is transferred to the backlight unit 510 through the frame 520, a component formed of a resin among components of the backlight unit 510 may be damaged by the heat. Accordingly, in the embodiment of the invention, the heat dissipation member 530 may be positioned on one surface of the back cover 560 covering the driver 550, thereby improving the heat dissipation effect of the driver 550.

Figure 53:
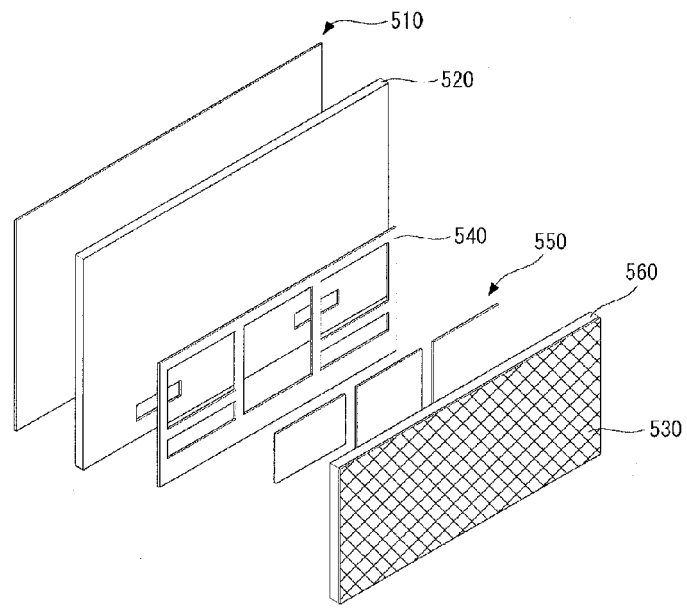
Figure 54:
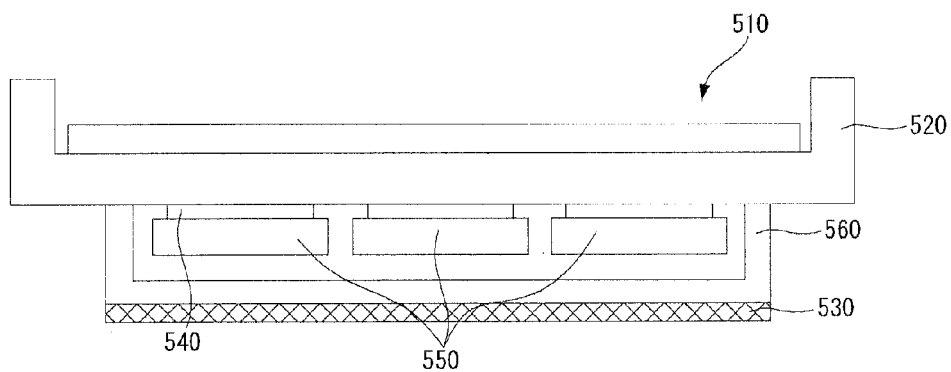

As shown in FIGS. 53 and 54, the heat dissipation member 530 according to the embodiment of the invention may be positioned on an external surface of the back cover 560 covering the driver 550.

As described above, the heat dissipation member 530 for dissipating the heat generated when the driver 550 is driven may be positioned on the external surface of the back cover 560 covering the driver 550. Hence, the backlight unit 510 may be prevented from being damaged by the heat that is generated in the driver 550 and is transferred to the backlight unit 510 through the frame 520.

FIGS. 55 to 68 illustrate a substrate including a plurality of subsidiary substrates. Structures and components identical or equivalent to those illustrated in FIGS. 1 to 54 are designated with the same reference numerals, and a further description may be briefly made or may be entirely omitted.

Figure 55:
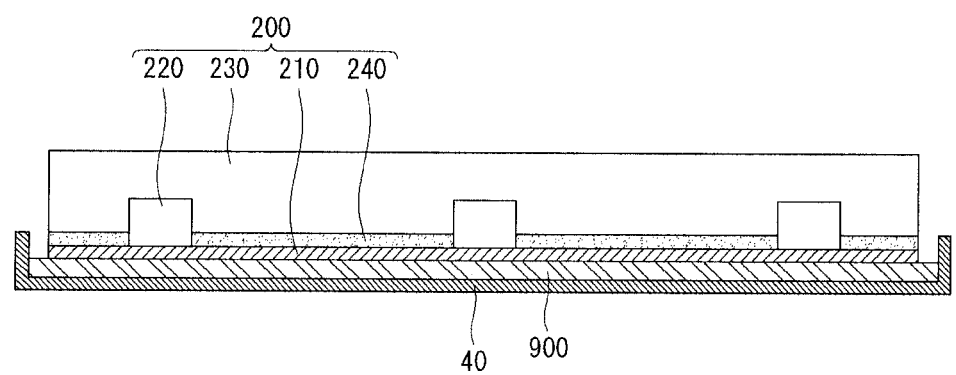
FIGS. 55 to 68 illustrate a substrate including a plurality of subsidiary substrates.

As shown in FIG. 55, a frame 135 may be positioned in the rear of a backlight unit 200, and an adhesive layer 900 may be positioned between the backlight unit 200 and the frame 135. Preferably, the adhesive layer 900 may be positioned between a back surface of a substrate 210 included in the backlight unit 200 and the frame 135.

The adhesive layer 900 may attach the substrate 210 of the backlight unit 200 to the frame 135. Hence, the backlight unit 200 may be more closely attached to the frame 135. As a result, the thickness of the display device may decrease.

Further, the adhesive layer 900 may transfer heat generated in light sources 220 positioned on the substrate 210 to the frame 135, thereby preventing an excessive increase in a temperature of the light sources 220. Because the adhesive layer 900 may transfer the heat generated in the backlight unit 200 to the frame 135, the adhesive layer 900 may be referred to as a thermal transfer layer.

It may be preferable that the adhesive layer 900 contains a thermal conductive material so as to transfer the heat generated in the light sources 220 to the frame 135. The thermal conductive material of the adhesive layer 900 is not particularly limited. Examples of the thermal conductive material of the adhesive layer 900 include a metal material and a carbon material. In the embodiment of the invention, it may be preferable that the adhesive layer 900 is formed using the metal material in consideration of the manufacturing cost and the ease of forming.

Figure 56:
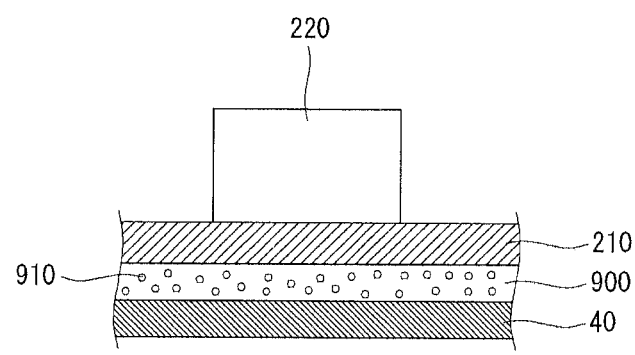

Further, the thermal conductive material of the adhesive layer 900 may be manufactured in the form of particles and may be distributed into the adhesive layer 900. For example, as shown in FIG. 56, the adhesive layer 900 may include metal particles 910.

As above, the adhesive layer 900 may include the metal particles 910 formed of the adhesive material and the thermal conductive material, so as to transfer the heat generated in the light sources 220 to the frame 135 while attaching the backlight unit 200 to the frame 135.

Figure 57:
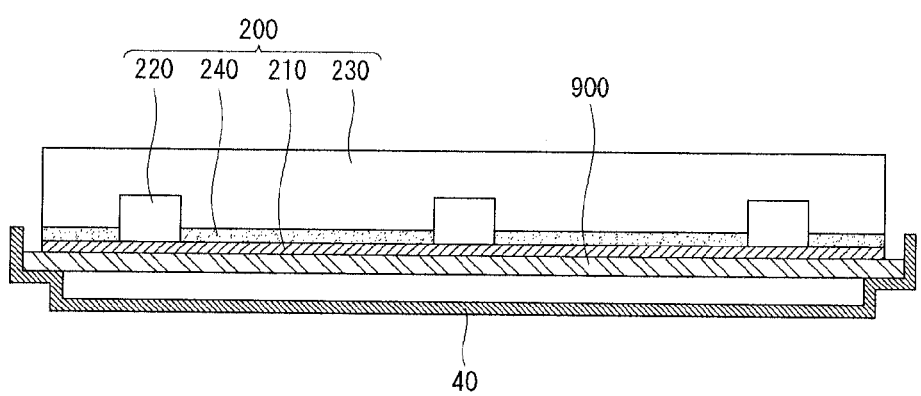

Unlike the embodiment of the invention, as shown in FIG. 57, the adhesive layer 900 between the backlight unit 200 and the frame 135 may be omitted, and the backlight unit 200 and the frame 135 may be spaced apart from each other at a predetermined distance.

In the structure illustrated in FIG. 57, because it is difficult to transfer the heat generated in the light sources 220 to the frame 135, the temperature of the light sources 220 may excessively increase. As a result, the light generation efficiency of the light sources 220 may be reduced.

Furthermore, when a resin layer 230 covering the light sources 220 is formed on the substrate 210, the entire thickness of the display device may decrease by closely adhering the resin layer 230 to other functional layer (for example, an optical sheet) positioned on the resin layer 230. However, the resin layer 230 may block the dissipation of the heat generated in the light sources 220, thereby excessively increasing the temperature of the light sources 220.

Furthermore, in the structure illustrated in FIG. 57, the thickness of the display device may increase because of a space between the backlight unit 200 and the frame 135.

Figure 58:
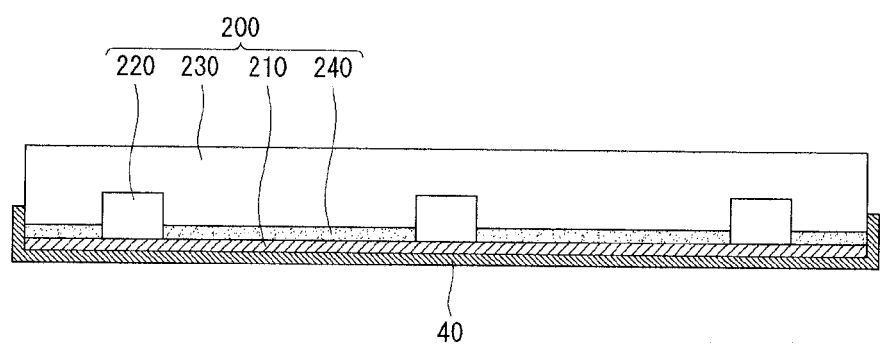

Alternatively, as shown in FIG. 58, the adhesive layer 900 between the backlight unit 200 and the frame 135 may be omitted, and the backlight unit 200 may be positioned directly on the frame 135.

When the structure illustrated in FIG. 48 is applied to the FIG. 58, the backlight unit 200 may contact a portion of the frame 135. However, because the substrate 210 of the backlight unit 200 and the frame 135 are in not a liquid state but a solid state, the backlight unit 200 cannot completely contact the frame 135. Hence, because it is difficult to transfer the heat generated in the light sources 220 to the frame 135, the temperature of the light sources 220 may excessively increase.

Further, in the structure illustrated in FIG. 48, because the backlight unit 200 does not closely adhere to the frame 135, a space between the backlight unit 200 and the frame 135 may be formed. Hence, the thickness of the display device may increase On the other hand, in the structure illustrated in FIG. 55 according to the embodiment of the invention, the adhesive layer 900 may be positioned between the backlight unit 200 and the frame 135, and the backlight unit 200 may closely adhere to the frame 135. Hence, the thickness of the display device may decrease. Further, because the heat generated in the light sources 220 is easily transferred to the frame 135, an excessive increase in the temperature of the light sources 220 may be prevented. As a result, a reduction in the efficiency of the light sources 220 may be prevented.

Further, in the structure illustrated in FIG. 55 according to the embodiment of the invention, the resin layer 230 covering the light sources 220 may be formed on the substrate 210. Therefore, even if it is difficult to dissipate the heat generated in the light sources 220 upward the light sources 220, the excessive increase in the temperature of the light sources 220 may be prevented by transferring the heat generated in the light sources 220 to the frame 135.

Figure 59:
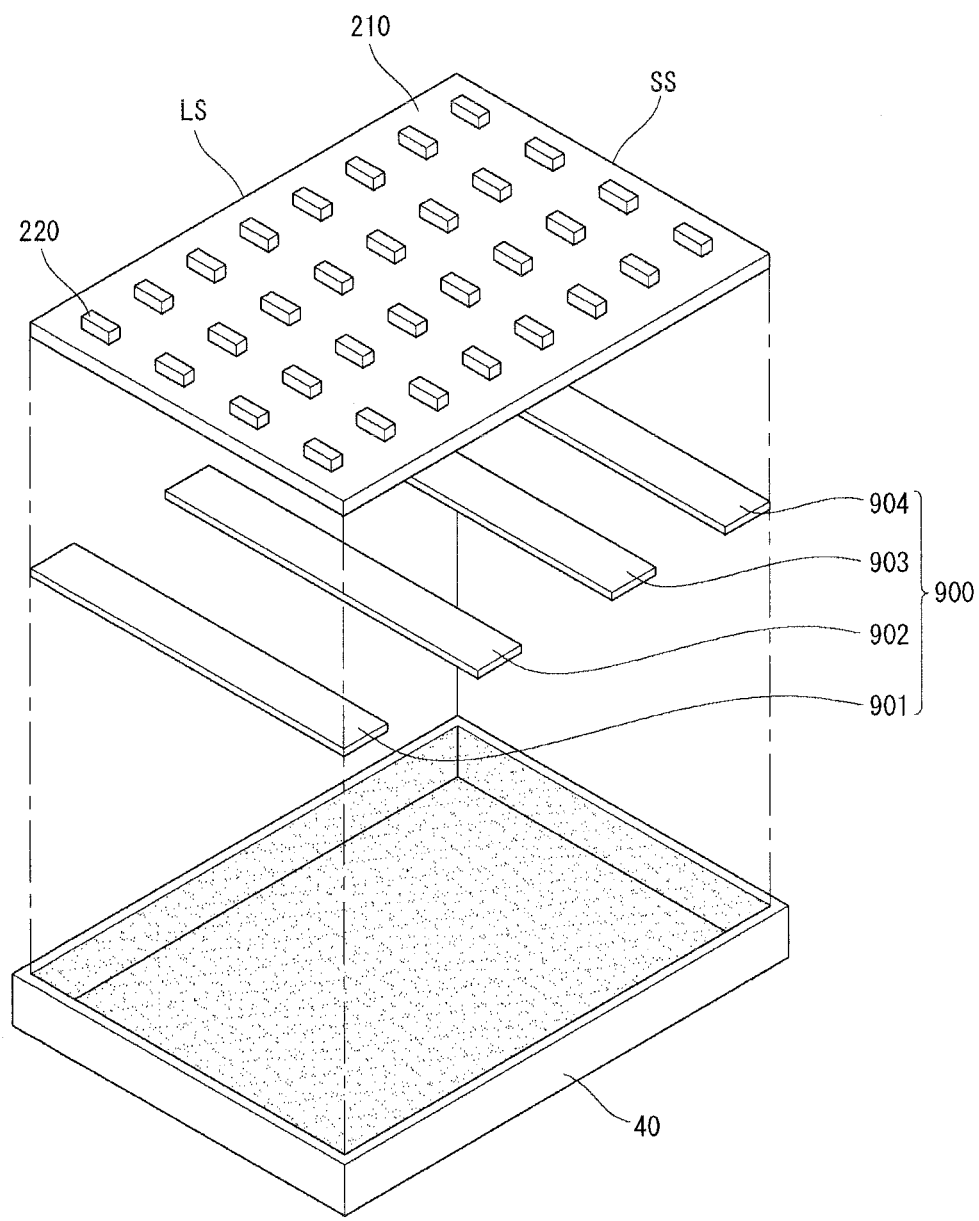

The adhesive layer 900 may be divided into a plurality of parts. For example, as shown in FIG. 59, the adhesive layer 900 may be divided into a first subsidiary adhesive layer 901, a second subsidiary adhesive layer 902, a third subsidiary adhesive layer 903, and a fourth subsidiary adhesive layer 904. The first to fourth subsidiary adhesive layers 901-904 may contain an adhesive material. The first to fourth subsidiary adhesive layers 901-904 may be positioned parallel to one another to be spaced apart from one another at a predetermined distance.

As above, when the plurality of subsidiary adhesive layers 901-904 are formed between the substrate 210 and the frame 135, the manufacturing process may be easily performed and the manufacturing cost may be reduced.

For example, the adhesive layer 900 may be formed by laminating a relatively narrow adhesive sheet, which is cut to correspond to a length of a short side SS of the substrate 210, on the back surface of the substrate 210. The first to fourth subsidiary adhesive layers 901-904 formed using the above-described laminating method may be positioned parallel to the short side SS of the substrate 210 to be spaced apart from one another at a predetermined distance.

Figure 60:
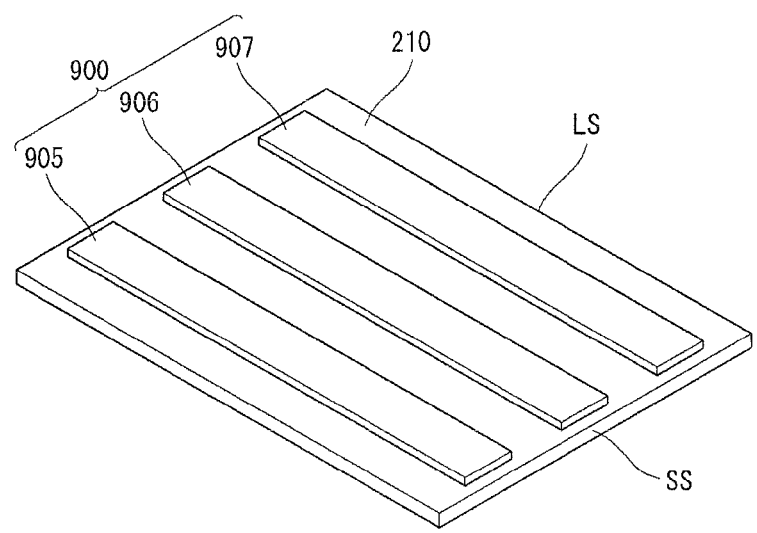

Alternatively, as shown in FIG. 60, the adhesive layer 900 may be divided into a fifth subsidiary adhesive layer 905, a sixth subsidiary adhesive layer 906, and a seventh subsidiary adhesive layer 907. The fifth to seventh subsidiary adhesive layers 905-907 may be positioned parallel to a long side LS of the substrate 210 to be spaced apart from one another at a predetermined distance.

Figure 61:
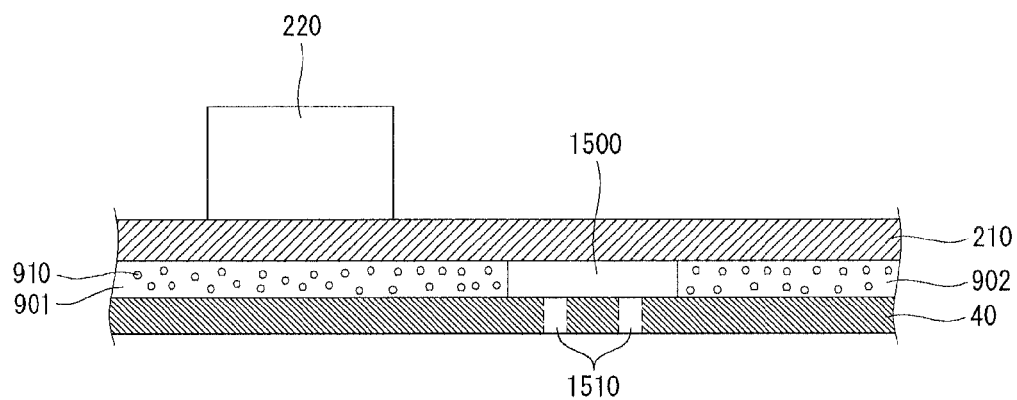

When the adhesive layer 900 is divided into the plurality of subsidiary adhesive layers, an air layer may be formed between the substrate 210 and the frame 135. For example, as shown in FIG. 61, an air layer 1500 may be formed between the first subsidiary adhesive layer 901 and the second subsidiary adhesive layer 902.

Holes 1510 may be formed in a formation area of the air layer 1500. The heat generated in the light sources 220 may more easily dissipated by circulating the air through the holes 1510.

Figure 62:
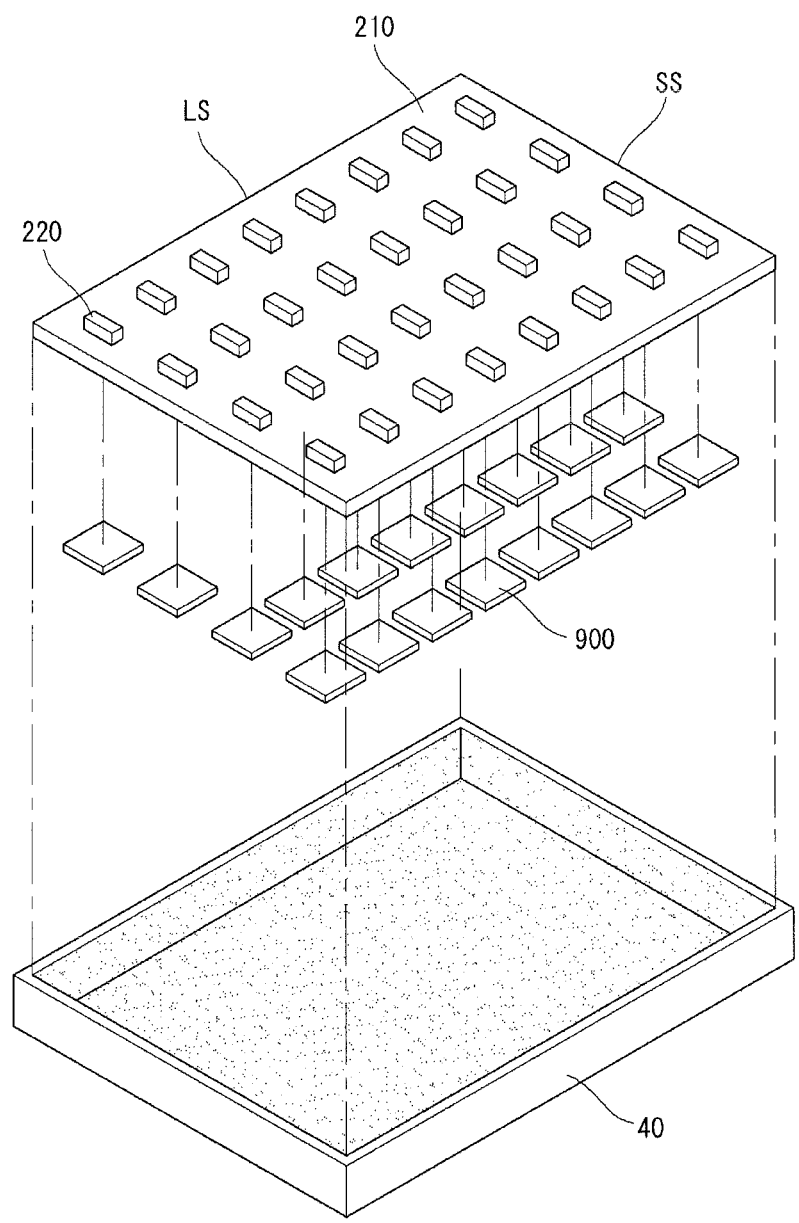

Alternatively, as shown in FIG. 62, the adhesive layer 900 may be formed in an area corresponding to the light sources 220. In this instance, the light sources 220 may correspond to the adhesive layers 900, respectively. Further, the adhesive layers 900 may be positioned to be spaced apart from one another.

Figure 63:
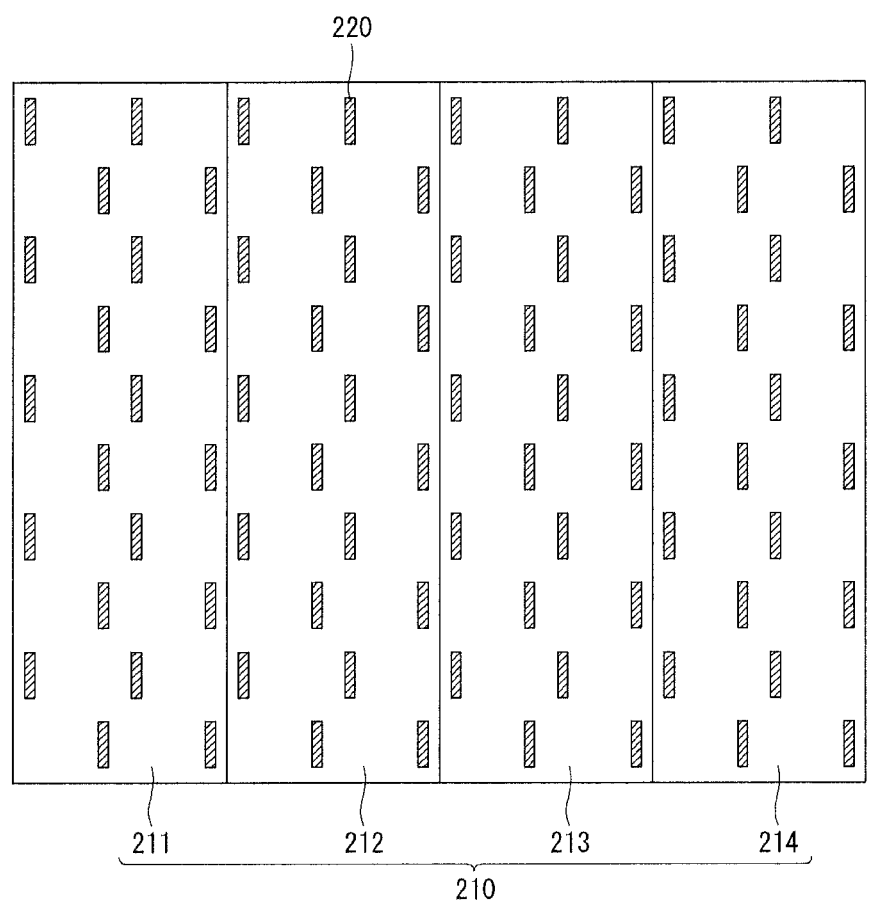

As shown in FIG. 63, one substrate 210 may be divided into a plurality of subsidiary substrates 211-214. For example, the substrate 210 may include a first subsidiary substrate 211, a second subsidiary substrate 212, a third subsidiary substrate 213, and a fourth subsidiary substrate 214.

Figure 64:
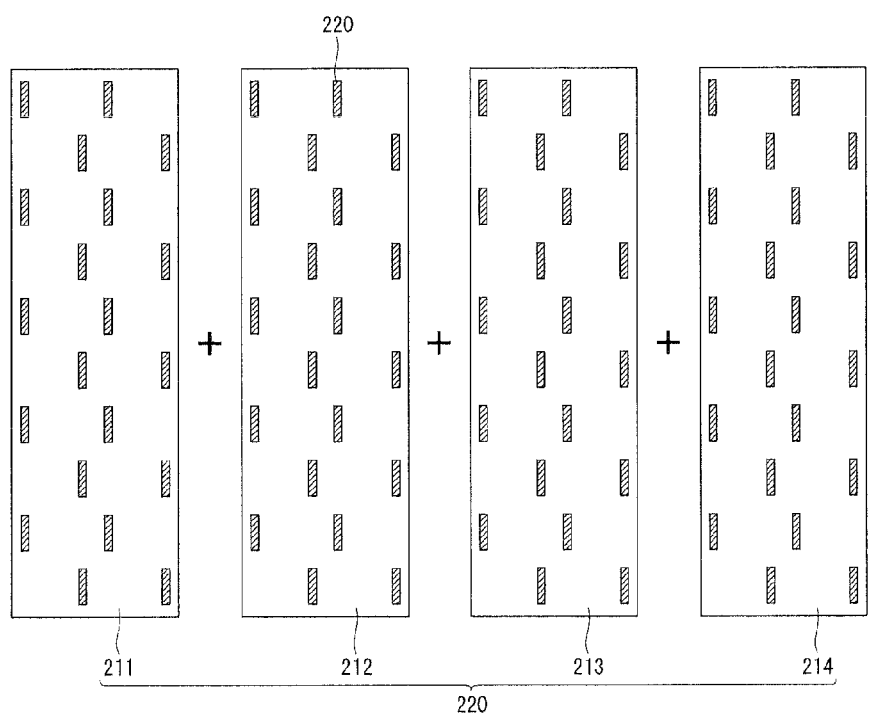

In this instance, as shown in FIG. 64, the plurality of light sources 220 may be disposed on each of the first to fourth subsidiary substrates 211-214, and then the first to fourth subsidiary substrates 211-214 may be combined parallel to one another to form one substrate 210.

When there is a defect in any one subsidiary substrate of the substrate 210 formed by combining the plurality of subsidiary substrates, only the defective subsidiary substrate may be replaced, and the remaining normal subsidiary substrates may be continuously used. Hence, the material used may be saved, and the manufacturing cost may be reduced.

As above, when the substrate 210 is divided into the plurality of subsidiary substrates, the adhesive layer 900 may be formed between the two adjacent subsidiary substrates.

Figure 65:
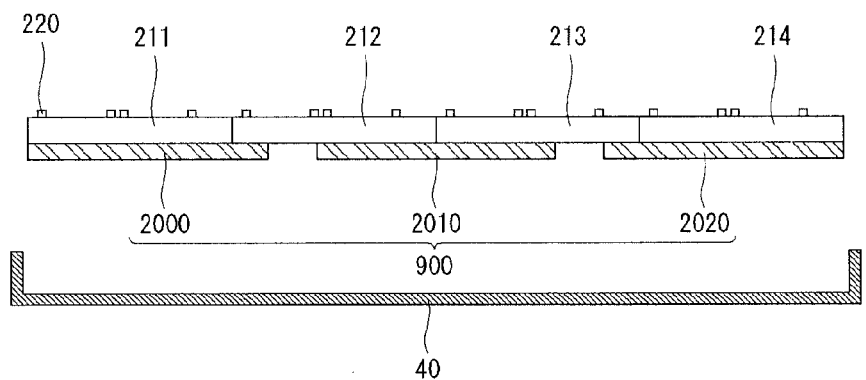

For example, as shown FIG. 65, the adhesive layer 900 may include a first subsidiary adhesive layer 2000, a second subsidiary adhesive layer 2010, and a third subsidiary adhesive layer 2020, that are positioned to be spaced apart from one another, and the substrate 210 may include the first to fourth subsidiary substrates 211-214. In this instance, the first subsidiary adhesive layer 2000 may be disposed to commonly overlap the first subsidiary substrate 211 and the second subsidiary substrate 212, the second subsidiary adhesive layer 2010 may be disposed to commonly overlap the second subsidiary substrate 212 and the third subsidiary substrate 213, and the third subsidiary adhesive layer 2020 may be disposed to commonly overlap the third subsidiary substrate 213 and the fourth subsidiary substrate 214.

In other words, the structure illustrated in FIG. 65 may be referred to as the structure for connecting the two subsidiary substrates using one subsidiary adhesive layer. Hence, while the subsidiary adhesive layer closely adheres the backlight unit 200 to the frame 135 and transfer the heat generated in the light sources 220 to the frame 135, the subsidiary adhesive layer may connect the two separated subsidiary substrates.

Figure 66:
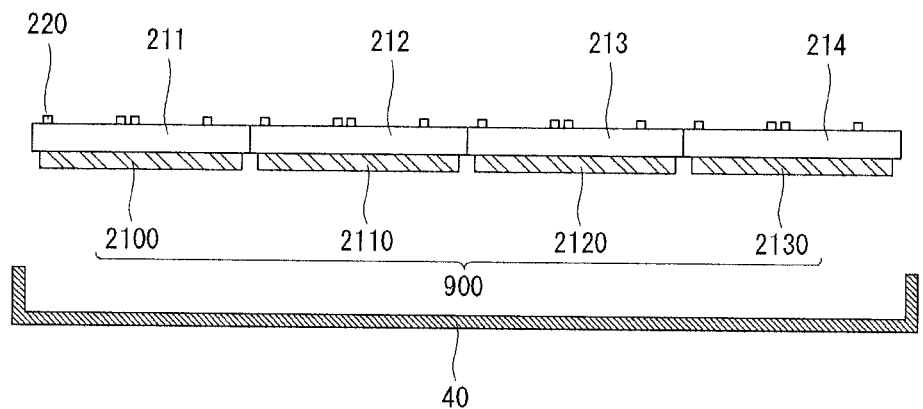

Alternatively, as shown in FIG. 66, one subsidiary substrate may correspond to one subsidiary adhesive layer. For example, the adhesive layer 900 may include a first subsidiary adhesive layer 2100, a second subsidiary adhesive layer 2110, a third subsidiary adhesive layer 2120, and a fourth subsidiary adhesive layer 2130, that are positioned to be spaced apart from one another, and the substrate 210 may include the first to fourth subsidiary substrates 211-214. In this instance, the first subsidiary adhesive layer 2100 may be positioned on a back surface of the first subsidiary substrate 211, the second subsidiary adhesive layer 2110 may be positioned on a back surface of the second subsidiary substrate 212, the third subsidiary adhesive layer 2120 may be positioned on a back surface of the third subsidiary substrate 213, and the fourth subsidiary adhesive layer 2130 may be positioned on a back surface of the fourth subsidiary substrate 214.

The first to fourth subsidiary substrates 211-214 may be manufactured by respectively disposing the first to fourth subsidiary adhesive layers 2100-2130 on the back surfaces of the first to fourth subsidiary substrates 211-214 and then connecting the first to fourth subsidiary substrates 211-214.

Alternatively, a distance between the two adjacent subsidiary adhesive layers may vary.

Figure 67:
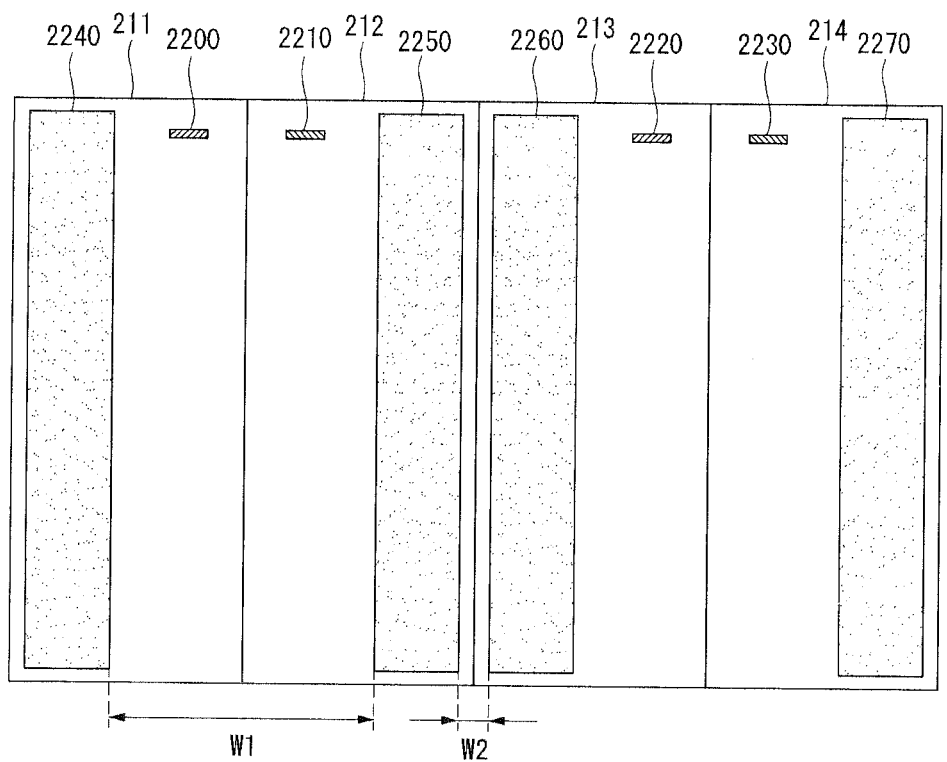

For example, as shown in FIG. 67, the adhesive layer 900 may include a first subsidiary adhesive layer 2240, a second subsidiary adhesive layer 2250, a third subsidiary adhesive layer 2260, and a fourth subsidiary adhesive layer 2270, that are positioned to be spaced apart from one another, and the substrate 210 may include the first to fourth subsidiary substrates 211-214. Further, a plurality of connectors may be disposed on the first to fourth subsidiary substrates 211-214. In other words, a first connector 2200 may be disposed on the first subsidiary substrate 211, a second connector 2210 may be disposed on the second subsidiary substrate 212, a third connector 2220 may be disposed on the third subsidiary substrate 213, and a fourth connector 2230 may be disposed on the fourth subsidiary substrate 214.

Each of the first to fourth connectors 2200-2230 may be connected to a cable (not shown) for electrically connecting the light sources 220 positioned on the first to fourth subsidiary substrates 211-214 to an external driving circuit (not shown).

Further, a plurality of subsidiary thermal transfer units may be positioned on the back surfaces of the first to fourth subsidiary substrates 211-214 without overlapping the first to fourth connectors 2200-2230. For example, as shown in FIG. 67, the first and second connectors 2200 and 2210 may be disposed between a first subsidiary thermal transfer unit 2240 and a second subsidiary thermal transfer unit 2250, and the third and fourth connectors 2220 and 2230 may be disposed between a third subsidiary thermal transfer unit 2260 and a fourth subsidiary thermal transfer unit 2270. Hence, a distance W1 between the first subsidiary thermal transfer unit 2240 and the second subsidiary thermal transfer unit 2250 may be greater than a distance W2 between the second subsidiary thermal transfer unit 2250 and the third subsidiary thermal transfer unit 2260.

Figure 68:
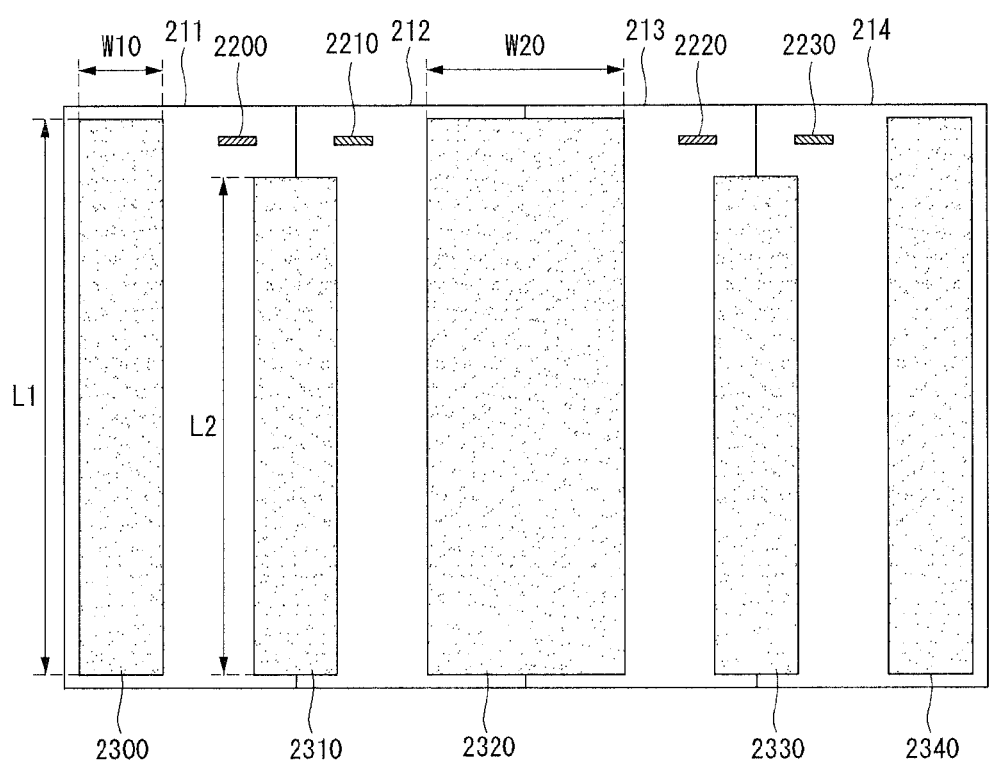

Alternatively, a length of one of the plurality of subsidiary adhesive layers may be different from lengths of other subsidiary adhesive layers. For example, as shown in FIG. 68, the adhesive layer 900 may include a first subsidiary adhesive layer 2300, a second subsidiary adhesive layer 2310, a third subsidiary adhesive layer 2320, a fourth subsidiary adhesive layer 2330, and a fifth subsidiary adhesive layer 2340, that are positioned to be spaced apart from one another, and the substrate 210 may include the first to fourth subsidiary substrates 211-214. Further, a plurality of connectors 2200, 2210, 2220, and 2230 may be disposed on the first to fourth subsidiary substrates 211-214, respectively.

Further, at least one of the first to fifth subsidiary adhesive layers 2300-2340 may be disposed at a location overlapping the connectors 2200-2230 at a location corresponding to the connectors 2200-2230, i.e., in a longitudinal direction.

For example, as shown in FIG. 68, the second subsidiary adhesive layer 2310 may be disposed at a location overlapping the first and second connectors 2200 and 2210 in a longitudinal direction, and the fourth subsidiary adhesive layer 2330 may be disposed at a location overlapping the third and fourth connectors 2220 and 2230 in a longitudinal direction. Hence, a distance L2 of each of the second subsidiary adhesive layer 2310 and the fourth subsidiary adhesive layer 2330 may be less than a distance L1 of each of the first subsidiary adhesive layer 2300, the third subsidiary adhesive layer 2320, and the fifth subsidiary adhesive layer 2340.

Further, a width of at least one of the first to fifth subsidiary adhesive layers 2300-2340 may be different from widths of other subsidiary adhesive layers. For example, as shown in FIG. 68, a width W20 of the third subsidiary adhesive layer 2320 may be greater than a width W10 of the first subsidiary adhesive layer 2300.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A display device comprising:
   a display panel;
   a frame disposed in the rear of the display panel;
   a backlight unit disposed between the display panel and the frame;
   at least one adhesive layer disposed between the backlight unit and the frame;
   a driver in the rear of the frame; and
   a back cover that is disposed in the rear of the driver
   wherein the adhesive layer includes a plurality of subsidiary adhesive layers that are positioned parallel to one another to be spaced apart from one another,
   wherein the substrate includes a plurality of subsidiary substrates each including the plurality of light sources,
   wherein the adhesive layer is positioned between the two adjacent subsidiary substrates,
   wherein the substrate includes first, second, and third subsidiary substrates that are positioned parallel to one another, wherein the adhesive layer includes a first subsidiary adhesive layer commonly overlapping the first and second subsidiary substrates and a second subsidiary adhesive layer commonly overlapping the second and third subsidiary substrates.

2. The display device of claim 1, wherein a portion of the back surface of the frame is exposed.

3. The display device of claim 1, wherein a distance between a first region of the frame and the driver is different from a distance between a second region of the frame opposite the first region and the driver,
   wherein a distance between the first region and the back cover is different from a distance between the second region and the back cover.

4. The display device of claim 3, wherein the distance between the first region of the frame and the driver is greater than the distance between the second region of the frame and the driver,
    wherein the distance between the first region and the back cover is greater than the distance between the second region and the back cover.

5. The display device of claim 1, wherein a hole is formed in the frame,
    wherein a wire passes through the hole and connects the display panel to the driver.

6. The display device of claim 1, wherein the backlight unit includes:
    a substrate;
    a light source disposed on the substrate; and
    a resin layer disposed on the substrate to cover the light source.

\* \* \* \* \*